United States Patent [19]

Ozawa et al.

[11] 4,383,263

[45] May 10, 1983

[54] LIQUID EJECTING APPARATUS HAVING A SUCTION MECHANISM

[75] Inventors: Masakazu Ozawa, Yokohama; Kunio Watanabe, Kawasaki; Kiyohide Kojima, Tokyo; Shinichi Seito, Tokyo; Takashi Miyazaki, Tokyo, all of Japan

[73] Assignee: Canon Kabushiki Kaisha, Tokyo, Japan

[21] Appl. No.: 263,030

[22] Filed: May 12, 1981

[30] Foreign Application Priority Data

May 20, 1980 [JP] Japan .................................. 55-66999
May 26, 1980 [JP] Japan .................................. 55-69835
Jun. 23, 1980 [JP] Japan .................................. 55-85022

[51] Int. Cl.[3] .............................................. G01D 15/18

[52] U.S. Cl. .............................................. 346/140 R

[58] Field of Search ................................ 346/140 PD

[56] References Cited

U.S. PATENT DOCUMENTS 4,123,761 10/1978 Kimura et al. ...................... 346/140

*Primary Examiner*—Stafford D. Schreyer

*Attorney, Agent, or Firm*—Fitzpatrick, Cella, Harper & Scinto

[57] ABSTRACT

A liquid-jet apparatus comprises a tank, a sub-tank to contain the liquid supplied from the tank, a liquid-ejecting head to eject the liquid supplied from the sub-tank, a suction mechanism which diminishes the inner pressure of the sub-tank followed by sucking the interior of the head.

30 Claims, 15 Drawing Figures

LIQUID EJECTING APPARATUS HAVING A SUCTION MECHANISM

BACKGROUND OF THE INVENTION

1. Field of the Invention

This invention related to improvement in a liquid ejecting apparatus, and in particular, to improvement in a liquid ejecting apparatus of an ink-on-demand type.

2. Description of the Prior Art

A liquid ejecting apparatus, particularly, that used for recording, has a recording head (a liquid ejecting head) provided with a fine ejecting conduit communicating with a fine liquid ejecting orifice. Therefore, when the apparatus is not operated, the liquid such as ink in the fine ejecting conduit often coagulates or is dried resulting in clogging the conduit. Or during transferring the apparatus, the vibration or impact often causes retreat of the meniscus formed at the tip of the ejecting conduit resulting in formation of the undesirable quality of images or inoperability of recording. During conducting the ink jet recording, fine fibers from the recording paper, dust in the ambient air, impurities in the ink and the like often cause clogging of the ejecting conduit resulting in inoperability of recording or poor quality of the recorded images. Therefore, a means for forming a negative pressure such as suction pumps, suction bombs and the like is, heretofore, attached to the tip of an ejecting conduit when necessary so as to suck the ink to clean the ejecting conduit, or an ink dissolving liquid is applied to the tip of the ejecting conduit to dissolve the solidified ink resulting in restoring the liquid droplet ejection. Though the conventional methods are effective when ink is present in the ink tank, when no ink is present in the ink tank, air is sucked into the liquid conduit in the recording head and this causes inoperability of recording or formation of poor quality of images.

In addition, according to conventional examples, such a state that no ink is present in a movable ink tank is caused by excess suction, inoperability of ink supply from a fixed ink tank due to clogging of the communicating path between the movable ink tank and the fixed ink tank, or vaporization of ink at the movable ink tank or the ink supplying path. In such a case, it is necessary to fill the movable ink tank with ink in advance as a pretreatment for sucking ink to restoring the ink jet recording. However, where the means for filling ink and the means for sucking ink for restoring the recording are independent from each other, upon occurrence of inoperability of recording or poor quality of images, it is not possible to determine wheather the ink filling means or the sucking means is the cause of the trouble. If the suction is conducted by mistake when no ink is present in the movable ink tank, it is not possible to restore the recording. In order to solve such problems, it has been proposed heretofore, for example, to detect the amount of ink remaining in a movable ink tank and that in a fixed ink tank, but the mechanism is complicated and the apparatus can not be simplified and minified.

SUMMARY OF THE INVENTION

An object of the present invention is to provide an improved liquid ejecting apparatus free from the disadvantages.

Another object of the present invention is to provide an improved liquid ejecting apparatus where air is prevented from entering the liquid path in a liquid ejecting head and where the restoring of recording can be made sure upon filling a liquid ejecting head with ink or restoring the recording (thereby eliminating a trouble which disturbs the recording or printing and enabling to effect the ink jet recording or printing).

A further object of the present invention is to provide a liquid ejecting apparatus which is simple, small and inexpensive.

According to the present invention, there is provided a liquid-jet apparatus comprising a tank, a sub-tank to contain the liquid supplied from the tank, a liquid-ejecting head to eject the liquid supplied from the sub-tank, a suction mechanism which diminishes the inner pressure of the sub-tank followed by sucking the interior of the head.

DESCRIPTION OF THE PREFERRED EMBODIMENTS

The present invention will be illustrated by reference to the drawings.

Figure 1:
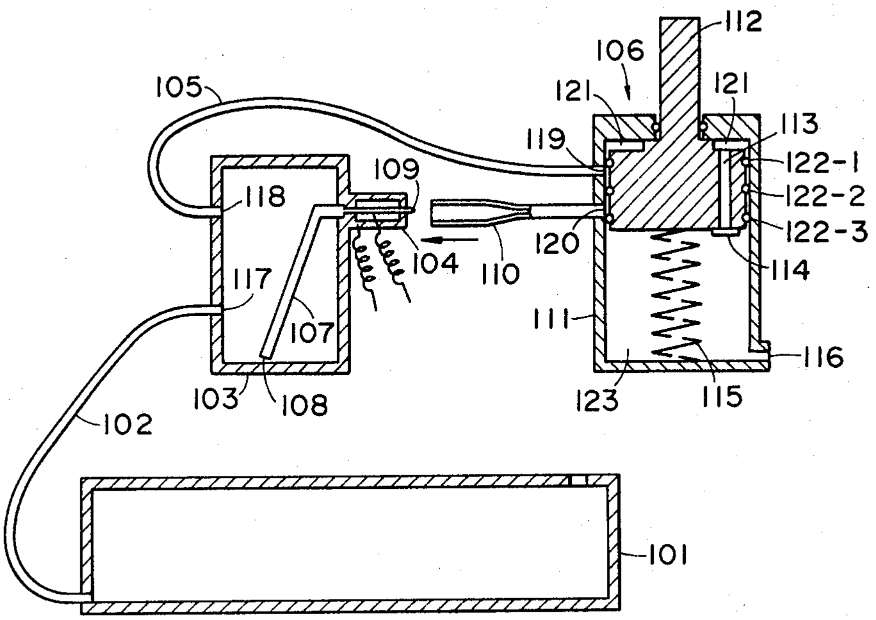
FIG. 1 is a schematic view of the first embodiment of the present invention.

FIG. 1 is a schematic diagram for illustrating the first embodiment of the present invention.

A liquid-jet apparatus shown in FIG. 1 comprises a first tank 101 containing liquid for recording, so-called "ink", a sub-tank 103 in communication with the tank 101 through a first connection path 102, a recording head 104 of liquid-ejecting type which is, integrated together with the sub-tank 103, and a liquid-introducing means 106 which is communicatively connected to the sub-tank 103 through a second connection path 105. The liquid-introducing means 106 comprises a suction mechanism by which the inside of the sub-tank 103 is brought to a negative pressure through the connection or suction path 105. The negative pressure state is produced by pressure difference which is formed by actuating the suction mechanism of the liquid-introducing means 106 between the sub-tank 103 and the liquid-introducing means 106 through the connection path 105. The degree of the negative pressure and the time for keeping the negative pressure state are set so that a desired quantity of liquid can be smoothy supplied through the connection path 102 from the tank 101 to the sub-tank 103. A supply path 107 is provided to charge liquid contained in the sub-tank 103 into the recording head 104. The supply path 107 is formed as a back portion of the recording head 104 or joined to the back end of the recording head. The supply path 107 is provided with an liquid-introducing inlet 108 to supply liquid for the recording head at the tip of the other end portion. A portion having the introducing inlet 108 is at least inside the sub-tank 103, and the liquid-introducing inlet 108 is disposed in such a way that the inlet is located the bottom of the subtank 103 or in the vicinity thereof. The supply path 107 may be formed by extending the end portion of upstream side of the means being the liquid path in the recording head 104, or alternatively connected with the means. As materials constituting the supply path 107 can be used most materials capable of smoothly supplying liquid and being free from undesirable interaction with liquid to be supplied. Representative materials which can be preferably used in the present invention are tubes of materials such as glass, plastics, and the like. Preferable plastics are polyethylene, polyvinylidene chloride, polyvinylidene fluoride, polyester, polyvinyl chloride, and the like. To an upper portion of the liquid-introducing means 106 is communicatively connected the other end of the second connection path 105 which is a flow path between the sub-tank 103 and the liquid-introducing means. Under the connecting position where the second connection path 105 is connected with the liquid-introducing means there is disposed a joining means 110 which is joined with an ejecting orifice 109 of tip end of the recording head to receive the liquid discharged from the orifice 109 which forms flying liquid droplets. The joining means 110 is made of a hollow tube and communicatively connected with the liquid-introducing means 106 so that the joining means can be brought to a suction state by operating the suction mechanism of the liquid-introducing means 106. The tip portion of the joining means 110 has a shape and a construction capable of being joined with the tip portion of the recording head 104 so that the liquid path of inside of the recording head 104 can be brought to a diminished pressure. The suction mechanism of the liquid-introducing means 106 shown in FIG. 1 possesses a suction pump construction which comprises a cylinder 111 being an outside frame for the suction pump and a piston 112. The piston 112 is provided with a vent 113. A valve 114 is mounted on the lower end opening of the vent 113. Three O-rings are disposed between the inner wall of the cylinder 111 and the outer wall of the piston. Each of three O-rings is fitted to each of grooves disposed on the periphery of the piston 112 in such a way that the ring tightens the piston 112, respectively. The piston 112 is normally present in the state where the piston is pushed up at the upper portion of the cylinder 111 by a spring 115 of which an end is fixed on the bottom of the cylinder 111. An outlet 116 is disposed at the bottom of the cylinder 111 so that the liquid sucked into the inside of the liquid-introducing means 106 flows out toward outside. When the volume under the cylinder 111 is sufficiently larger, the outlet 116 is not necessarily disposed. There may be provided a fine hole capable of communicating to the atmosphere. To the outlet 116 may be connected a liquid-absorbing means (not shown in FIG. 1) which absorbs the effluent liquid and evaporates it. Such liquid absorbing means is representatively made of materials such as sponge, porous materials, felt, and the like. Alternatively, at the downstream of the outlet 116 may be provided a tank for effluent liquid to hold the effluent liquid in the tank.

The apparatus shown in FIG. 1 will be illustrated more concretely. At the sub-tank 103 are provided a liquid-supplying port 117 and a suction port 118 which sucks air and/or liquid. The liquid-supplying port 117 is communicatively connected to the first tank 101 through the first connection path 102. The suction port 118 is communicatively connected to an inlet 119 of the liquid-introducing means 106 through the second connection path 105 which is preferably made of flexible materials. In the apparatus shown in FIG. 1, the sub-tank 103 is always connected with the liquid-introducing means 106 through the second connection path in the case except for emergency. An inlet 120 provided at the liquid-introducing means 106 is communicatively connected to the joining means 110. The joining means 110 can be joined to the recording head 104 at a desired time. Liquid is supplied from the tank 101 into the sub-tank 103 by downward movement of the piston 112, that is, by manually pushing down the upper end portion of the piston 112 being a member of the liquid-introducing means 106. When the piston 112 is moved downwards, the valve 114 closes the vent 113. Therefore, a space region 121 of the cylinder 111 where exists at upper portion of the piston 112 is brought to a negative pressure. The negative pressure state in the cylinder 111 diminishes the pressure in the sub-tank 103 through the connection path 105 to produce a pressure difference between the pressure in the sub-tank 103 and that in the tank 101 through the first connection path 102. By the pressure difference, the liquid in the tank 101 is moved from the tank 101 to the sub-tank 103. When the piston 112 is further brought to a position where a position of the O-ring 122-1 comes down to the portion lower than an inlet 120, a pressure in the path of the joining means 110 is diminished through the inlet 120. At this case, when the recording head 104 is connected to the joining means 110, the liquid in the sub-tank 103 is sucked into the inside of the recording head 104 on the ground of the pressure difference produced through the joining means 110 and the liquid path in the recording head 104. Accordingly, the liquid is supplied into the liquid path in the recording head 104. When an amount of the liquid introduced into the sub-tank 103 exceeds over the level where the liquid-introducing inlet 108 provided at the tip of the supply path 107 is at least immersed with the liquid, the liquid can move into the liquid path in the recording head 104 through the joining means 110. Further, when the surface of the liquid supplied into the sub-tank 103 exists in the vicinity of the liquid-introducing inlet 108, upon supplying liquid into the recording head 104, a fluid resistance of the first connection path 102 and that of the supply path 107 are so controlled that an amount per unit time of the liquid introduced from the liquid-introducing inlet 108 to the recording head 104 becomes smaller than that of the liquid introduced from the tank 101 to the sub-tank 103.

For prevention of gas or bubbles being introduced into the liquid path in the recording head 104, it is required to supply liquid into the recording head 104 after a sufficient amount of liquid is supplied into the sub-tank 103. For this purpose, movement of the piston 112 must be carried out in two step motions. In other words, in the first step motion, the piston 112 is downwards moved so that a position of the O-ring 122-1 may be brought between the inlets 119 and 120. Therefore, the liquid is supplied from the tank 101 to the sub-tank 103 by diminishing the inner pressure of the sub-tank 103 only through the second connection path 105. A degree of negative pressure in the sub-tank 103 which is produced by the first step motion exceeds a degree where liquid is sufficiently supplied into the sub-tank 103. After a sufficient amount of liquid is supplied into the sub-tank 103, the second step motion of downward movement of the piston 112 is carried out. In other words, the piston 112 is downward moved so that a position of the O-ring 122-1 may be brought under the inlet 120. Therefore, a pressure difference is produced between the sub-tank 103 and the joining means 110 through the recording head 104 to fill the liquid path in the recording head 104 with liquid. Speed of downward movement of the piston 112 during the second step motion, and a time interval between the first and the second step motions are suitably determined with design of an apparatus so that supplying liquid to the sub-tank 103 and the recording head 104 can be desirably carried out. Sizes and shapes of the first connection path 102, the second connection path 105, the supply path 107, the liquid introducing port 117, the suction port 118, and the liquid-introducing inlet 108 are designed suitably desirable. In connection with the above, sizes of the inlets 119 and 120 are suitably designed and prepared, thereby downward movement of the piston 112 can be continuously carried out without carrying out in the two step motions. When the surface of the liquid introduced into the sub-tank 103 by downward movement of the piston 112 exceeds upwards the suction port 118, liquid flows into the upper space region 121 in the cylinder 111 through the connection path 105 from the inlet 119. The liquid introduced into the space region 121 then flows into the vent 113 and opens the valve 114 to flow into a space region 123 existing the under portion of the cylinder. When downward movement of the piston 112 extends to the under dead point, the piston 112 can return back its original position under the action of the spring 115. When the piston 112 is raised the valve 114 is opened on account of the pressure difference between the vent 113 and the space region 123. Thereby the upper space region 121 of the cylinder 111 is communicated to the atomosphere through the outlet 116. When the valve 114 is open the liquid existing in the vent 113 and/or the space region 121 flows into the under space region 123. The piston 112 of the liquid-introducing means 106 in the apparatus shown in FIG. 1 is provided with three O-rings 122-1, 122-2 and 122-3 as described previously. When the piston 112 presents at the original position (upper dead point) inlets 119 and 120 are blocked with the piston 112 and these O-rings. If printing is obstructed by regression of the meniscus of the liquid resulting from the loss of the balance caused by clogging in the recording head 104 or lowering of the surface of the liquid in the sub-tank 103, an operation for restoring printing can be easily carried out in a way similar to that described above.

The operation for restoring printing will be briefly described below.

It is a cause to hinder printing that an amount of the liquid in the sub-tank 103 is diminished on account of some causes, and that a meniscus of the liquid regresses excessively from the orifice 109 of the recording head 104 on account of lowering the surface of the liquid in the sub-tank 103. It is another cause to obstruct printing that, in the case of carrying out printing by sliding sidewise the sub-tank 103 with the recording head 104, the meniscus regresses excessively by shock upon returning and can not be restored to the normal position, thereby liquid droplets are unsteadily ejected or can not be ejected. It is a further cause that bubbles tend to be introduced into the recording head 104 upon sliding sidewise. It is a still further cause that liquid clogs in the recording head 104 on account of dry-up of liquid in a liquid path of the recording head 104 or contamination of liquid with foreign matters.

When printing is hindered with the abovementioned causes, printing can be restored in the following manner.

The joining means 110 is joined to the tip end of the recording head 104 to push the piston 112. As the first step, the O-ring 122-1 is passed the inlet 119, thereby the upper space region 121 of the cylinder 111 is communicatively connected to the sub-tank 103 through the connection path 105 to suck the air in the sub-tank 103 by the negative pressure produced in the cylinder 111. Therefore, liquid is injected from the tank 101 to the sub-tank 103. At this time, since the inlet 120 is blocked by the O-rings 122-2 and 122-3, liquid can not move through the recording head 104.

When the piston 112 is further moved downwards, as the second step, the O-rings 122-1 and 122-2 are passed the inlet 119. Therefore, the inlet 119 is communicatively connected to the upper space region of the cylinder 111 so that liquid is sucked into the upper space region of the cylinder 111 through the recording head 104 and the joining means 110. At this time, if there is matter which hinders ejection of liquid, the matter is sucked with the liquid into the upper space region 121 of the cylinder. When the piston 112 is raised the matter is discharged to the outside of the liquid-introducing means 106 through the vent 113, the valve 114, and the outlet 116.

As described above, in the apparatus shown in FIG. 1, when the piston 112 being a member of the liquid-introducing means 106 is pushed, the remaining air in the sub-tank 103 is sucked so that liquid is introduced from the tank 101 to the sub-tank 103. After the back end of the supply path is immersed into the liquid, the liquid is sucked through the recording head 104. As the result, it is prevented that air is introduced into the liquid path in the recording head 104. Further, if necessary, the surface of the liquid in the sub-tank 103 can be raised to the suction port 118 by repeating push movement of the piston 112. At this situation, the liquid is also sucked through the suction port 118 so that the surface of the liquid in the sub-tank 103 is kept at the level of the suction port 118. At this situation, a constant air layer is present in the upper portion above the suction port 118 of the sub-tank 103. The air layer serves as an absorber for impact pressure generating on movement of the sub-tank 103.

For controlling flow amounts of liquid and/or air through the recording head 104 and those through the second connection path 105, a fluid resistant may be provided in the second connection path 105. Such fluid resistant can be made of porous plastics, porous ceramics, glass having fine holes, felts, sponges, orifices, and the like.

It is preferable to mount a filter for removing foreign matter in the supply path 107 or preferably on the liquid-introducing inlet so that the filter can prevent nonfluidal foreign matter existing in the liquid of the sub-tank 103 from invading into the liquid path in the recording head 104 and clogging the liquid path.

Figure 2:
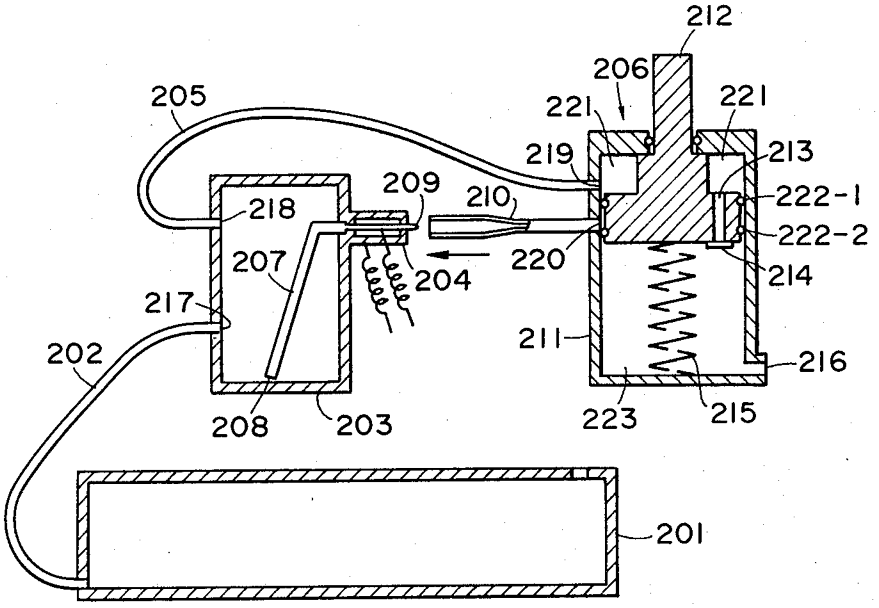
FIG. 2 is a schematic view of the second embodiment of the present invention.

FIG. 2 shows the second embodiment according to the present invention.

In the apparatus shown in FIG. 2, two O-rings are disposed an a piston 212 being a member of a liquid-introducing means 206. At the upper dead point of the piston 212, an inlet 220 is blocked with the two O-rings. An inlet 219 always is communicatively connected with an upper space region 221 of the piston 212. Except for the above, the apparatus shown in FIG. 2 is essentially similar to that shown in FIG. 1. In the apparatus of FIG. 2, even when the sub-tank 203 is filled with liquid and air layer is absent in the sub-tank 203, the sub-tank 203 can be communicatively connected to the atmosphere by opening a valve 214 provided on a vent 213 of the piston 212. Accordingly, even if hard change of inner pressure in the sub-tank suddenly occurs to the extent that printing is subjected to adverse influence, the apparatus can be prevented from the bad influence. Liquid tends to leak out on transporting an apparatus, the leakage can be prevented with desirably determining strength of the valve 214 and a fluid resistance provided in a second connection path 205.

Figure 3:
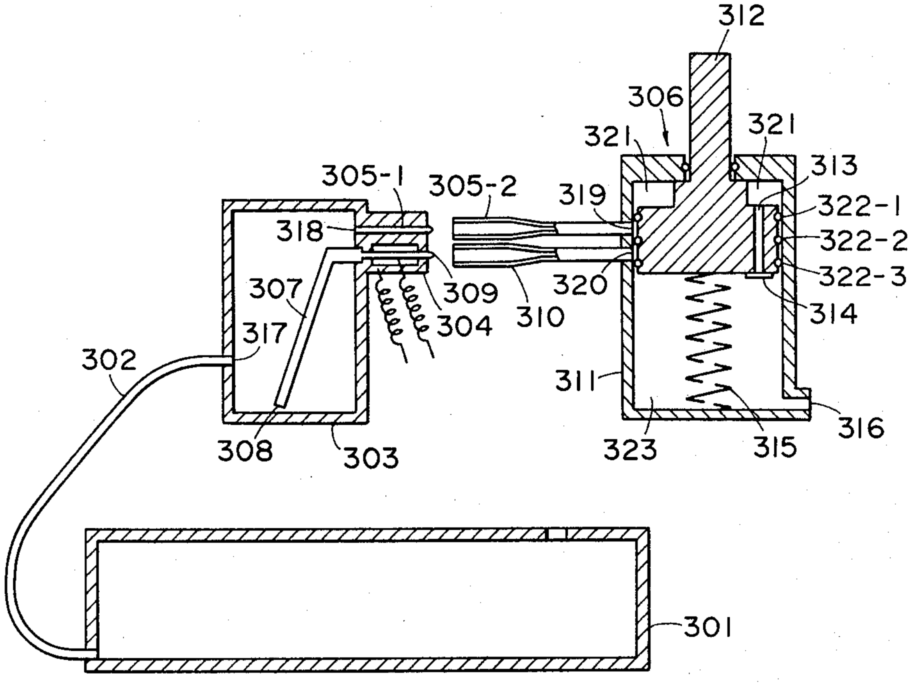
FIG. 3 is a schematic view of the third embodiment of the present invention.

FIG. 3 shows the third embodiment according to the present invention.

The apparatus shown in FIG. 3 is essentially similar to that shown in FIG. 1 except that the apparatus shown in FIG. 3 is separably provided with the second connection path shown in FIGS. 1 and 2. The separable second connection path 305 is constructed with a section 305-1 of a connection path on a sub-tank 303 and a section 305-2 of a connection path on a liquid-introducing means 306. The section 305-1 of the connection path is provided with a projecting at the tip end to be easily capped with the section 305-2. The section 305-2 of the connection path has a construction similar to a joining means 310 to which the section 305-1 can be easily inserted. It is desirable that the section 305-1 has the same construction and the same size and that of recording head 304 for cutting costs by reducing types of parts. For example, junction between sections 305-1 and 305-2 is preferably carried out with junction between the recording head 304 and the joining means 310 for simplifying an operation mechanism and securing practice of operation, before a carriage loading the sub-tank 303 and the recording head 304 stops at the predetermined position and operation for introducing liquid into the liquid-introducing means 306 is carried out. The size and constitution of section 305-1 of the joining path are suitably determined so that the section 305-1 of the connection path can serve as a vent against sudden and hard change of inner pressure in the sub-tank 303 in the extent that printing is subjected to inverse influence, and so that the surface tension at the tip of section 305-1 of the joining path can prevent leakage of liquid upon moving such as transporting the apparatus.

The fourth embodiment according to the present invention will be described by reference to FIGS. 4A and 4B.

Figures 4A, 4B:
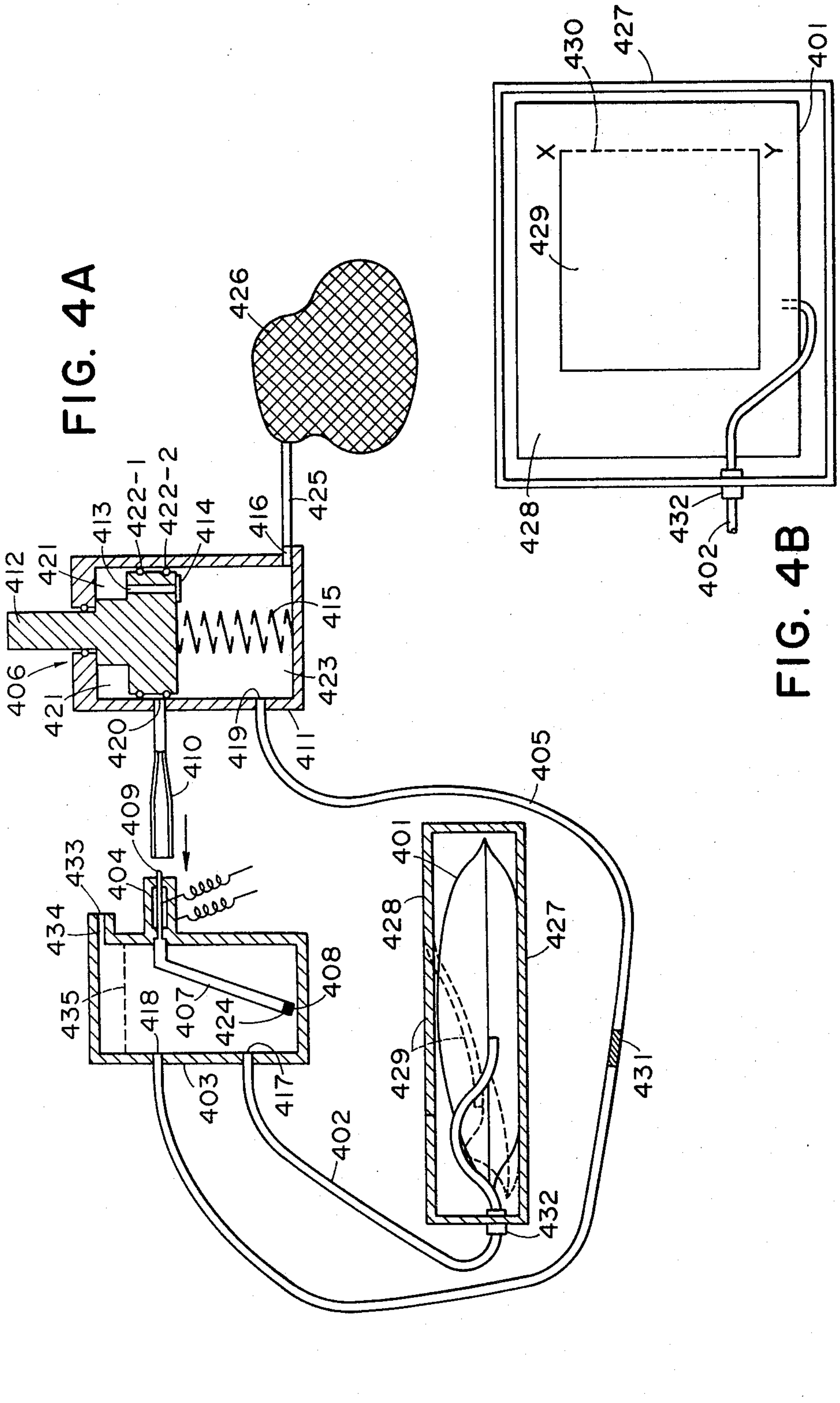
FIG. 4A is a schematic view of the fourth embodiment of the present invention.
FIG. 4B is a schematic plane view of the cassette shown in FIG. 4A.

A liquid-jet apparatus shown in FIG. 4A comprises a first tank 401 containing liquid for recording, so-called "ink", a sub-tank 403 in communication with the tank 401 through a first connection path 402, a liquid-jet head 404 which is integrated together with the sub-tank 403, and a liquid-containing means which is communicatively connected to the sub-tank 403 through a second connection path 405.

The liquid-containing means 406 comprises a liquid-containing portion 423 at under portion thereof which is a space region for temporally containing liquid, and the liquid-containing portion 423 is communicatively connected through an inlet 419 with the second connection path 405 which is communicatively connected to an outlet 418 provided at the upper portion of the sub-tank 403.

The sub-tank 403 is communicatively connected with a supply port 408 for supplying liquid into the head 404. The liquid contained in the sub-tank 403 is supplied from the supply port 408 to the head 404 through a supply path 407 which communicatively connects the supply port 408 with the liquid path in the head 404.

In the apparatus shown in FIG. 4A, the supply path 407 is disposed in the sub-tank 403 as a component of the sub-tank 403. It is required to dispose such supply path in case that a position of the inlet of the head 404 is far apart upwards from a position of the supply port 408 as shown in FIG. 4A. Therefore, in case that the inlet of the 404 is disposed in the vicinity of bottom of the sub-tank 403, the supply port 408 may be directly disposed on the wall surface of the sub-tank 403 without disposing the supply path 407.

It is desirable that the supply path 407 is disposed as shown in FIG. 4, the supply port 408 is located at the bottom of the sub-tank 403, and the recording head 404 is disposed at an upper portion of the sub-tank 403 to obtain good printing characteristics, stable supply of liquid into the head 404, and ability to sufficiently use liquid contained in the sub-tank 403.

In other words, the supply portion 408 is positioned in the vicinity of bottom of the sub-tank 403, a liquid inlet for the liquid-jet head 404 is disposed on the upper side wall of the sub-tank, and the supply path 407 communicatively connects the supply port 408 with the liquid inlet. The supply path 407 may be joined to the back end (end section of upstream side) of liquid path in the liquid-jet head 404, or alternatively formed by extending the liquid path in the head 404.

On the supply port 408 or the supply path 407, it is preferably disposed a filter 424 where liquid passes easily and bubbles can be prevented from passing so as to prevent bubbles from invading into the liquid path in the liquid-jet head 404 upon use. Examples of the filter 424 having such function, for example, include a porous material having a number of fine through holes, fibrous materials such as felt, and the like. The supply path 407 may be composed of most materials capable of smoothly supplying liquid and being free from undesirable interaction with liquid to be supplied. Representative materials which can be effectively used in the present invention are tubes of materials such as glass, plastics, and the like. Preferable plastics are polyethylene, polyvinylidene chloride, polyvinylidene fluoride, polyester, polyvinyl chloride, and the like.

An outlet 418 which connects communicatively between the second connection path and the sub-tank 403 is located at a position of the side wall where is higher than the inlet 417 and apart at a predetermined distance from the highest wall of the sub-tank 403.

An air layer formed in the highest portion of the sub-tank 403 has the ability to relax pressure change generating in the case where the sub-tank 403 repeats movement, e.g., sidewise sliding while ejecting liquid from the liquid-jet head 404. This point will be described later in detail.

An opening 433 is disposed at the upper portion of the sub-tank 403, that is, at a position higher than the outlet 418 as a ventilation means for nearly balancing an inner pressure of the sub-tank 403 with the atmosphere at a steady state. The opening 433 is disposed for preventing the inner pressure of the sub-tank 403 from being brought to an excessively negative pressure based on diminution of the liquid in the sub-tank 403 upon recording. Therefore, the opening 433 is available for stably ejecting liquid droplets from the liquid-jet head 404 in order to carry out printing excellently. Additionally, the opening 433 has the function that the liquid is rapidly and smoothly supplied to the sub-tank 403 and the liquid-jet head 404.

A fluid resistant 434 is preferably mounted in the opening 433 to control the flow rate of the liquid. Materials for the fluid resistant 434 and construction thereof are designed in such a way that air can pass through the fluid resistance and the liquid contained in the sub-tank 403 can not pass through. For example, in case that liquid used is an aqueous ink, the fluid resistance is made of a porous and water-repellent material having a number of fine through holes, water repellent finished glass-wool, or porous ceramics etc.

It is advantageous for stably ejecting liquid droplets that a liquid-surface controlling means 435 of meshes or having a number of fine holes is disposed between the outlet 418 and the opening 433. The liquid-surface controlling means 435 serves as a means which prevents the liquid contained in the sub-tank 403 from leakage through the opening 433. The leakage results from disturbance of the surface of the liquid contained in the sub-tank 403 which is caused by transporting the sub-tank 403 or impact from outside etc.

To the under portion of liquid-containing means 406 is communicatively connected one end of the second connection path 405 which is a liquid path between 406 and the sub-tank 403. Above the position where the second connection path 405 is connected to 406 is disposed a liquid-receiving means 410 which can be connected to an ejecting orifice 409 of the liquid-jet head 404 which forms flying liquid droplets in order to receive the liquid ejected from the orifice 409. The liquid-receiving means 410 is made of a hollow tube and communicatively connected to the liquid-containing means 406 so that 410 can be brought to a suction state by actuation of the suction mechanism of the liquid-containing means 406. The tip of the liquid-receiving means 410 has a shape and construction capable of connecting with the tip of the head 404 so as to diminish the pressure of the liquid path in the liquid-jet head 404. The suction mechanism of the liquid-containing means shown in FIG. 4A possesses a suction pump construction which comprises a cylinder 411 being an outside frame for the suction pump and a piston 412. The piston 412 is provided with a through hole 413. A valve is mounted on the lower end opening of the through hole 413. Two O-rings 422-1 and 422-2 are disposed between the inner wall of the cylinder 411 and the outer wall of the piston. Each of two O-rings is fitted to each of grooves disposed on the periphery of the piston 412 is such a way that the ring tightens the piston 412, respectively. The piston 412 is normally present in the state where the piston is pushed up at the upper portion of the cylinder 411 by a spring 415 of which, if necessary, an end is fixed on the bottom of the cylinder 411. An outlet 416 is disposed at the bottom of the cylinder 411 so that the liquid sucked into the liquid-containing means 406 flows out toward outside. To the outlet 416 is connected a liquid-absorbing means 426 where the liquid flowed out through an outflow path is absorbed and spontaneously evaporated. Such liquid-absorbing means 426 can be typically made of so-called sponge, porous material, felts, and the like. Alternatively, at the downstream of the outlet may be disposed a tank for containing an outflow liquid so as to contain the outflow liquid into the tank. When the under volume of the cylinder 411 is sufficiently larger, the outlet 416 is not necessary disposed. There may be disposed a fine hole capable of communicating to the atmosphere. Of course, it is not required to provide the outflow path 425 and the liquid-absorbing means 426.

In the apparatus shown in FIG. 4, the tank 401 is a kind of bag capable of freely changing volume which is made of plastic sheets, rubbers, metal foils, films, and the like. The tank is placed in a cassette 427 of a hard case so that the tank 401 can be easily set in the predetermined position and prevented from an impact or a break resulting from the external cause.

One end of the first connection path 402 is inserted into the tank 401 so that the liquid contained in the tank 401 can be smoothly supplied into the sub-tank 403. In order that the first connection path 402 connects the tank 401 with the sub-tank 403, the connection path 402 may be communicatively connected at an opening member 432 or prepared in a continuous tube which passes through the opening member 432.

As shown in FIG. 4B which is a schematic plane view of the cassette 427 shown in FIG. 4A, there is provided a press means 429 which is formed by three cuts in a nearly central position of the upper cover 428 of the cassette 427 in which the tank 401 is placed. The press means 429 presses downwards the tank 401 as follows. When the press means 429 is downwards pushed with finger etc., the press means 429 bends to inside (bending state is shown by the dotted line) of the cassette 427 along the dotted line 430 (X Y line). The liquid contained in the tank 401 is pushed toward the first connection path 402 base on the abovementioned movement. At this time, a pressure difference is produced between the tank 401 and the sub-tank 403, therefore the liquid is smoothly introduced from the tank 401 to the sub-tank 403. By pressing action of the press means 429, the liquid pushed out from the tank 401 flows into the sub-tank 403 through the first connection path 402 to supply the predetermined amount of liquid into the sub-tank 403. When pressing action of the press means 429 for supplying liquid into the tank 401 is sufficiently large, the surface of the liquid introduced into the sub-tank 403 extends to the outlet 418, subsequently the liquid flows over the outlet 418 to flow into the liquid-containing portion 423 of the liquid-containing means 406. The press movement of the press means 429 may be carried out manually or electrically by using a solenoid.

When liquid is introduced into the sub-tank 403 over the level where the supply port 408 is at least immersed with inflow liquid, the liquid can move into the liquid path in the head 404 by suction of the liquid through the liquid-receiving means 410 connected with the ejecting orifice 409 present at the tip of the liquid-jet head 404. The suction is caused by the actuation of suction mechanism of the liquid-containing means 406. The suction state can be allowed to coexist with the press state, or independently produced in case that liquid exists sufficiently in the sub-tank 403.

For more effectively effecting the liquid-supplying operation and the operation for restoring the liquid ejection, it is preferable that the press movement and the suction movement are used together after a sufficient amount of the liquid is supplied into the sub-tank 403.

The press means 429 may be constructed with a flexible plate formed by cuts on the upper cover 428 of the cassette 427 as shown in FIG. 4B, or alternatively, with such means capable of applying press as springs, pistons, plungers, and the like.

In the second connection path 405 there is disposed a fluid resistant 431 to control difference between an amount per unit time of the liquid in the liquid path in the liquid-jet head 404 and that of the liquid in the second connection path 405.

The fluid resistant 431 is disposed so that an outflow amount of the liquid through the supply port 408 can become sufficiently larger than that of the liquid through the outlet 418, for the purpose of recovering smoothly printing resulting from smoothly and effectively supplying the liquid into the liquid-jet head 404 and effectively sucking the liquid contained in the sub-tank 403 through the liquid path in the head 404 by suction force through the liquid-receiving means 410. In the apparatus shown in FIG. 4A, the fluid resistant 431 serves to control the fluid resistance of the second connection path 405 so that the liquid flowing into the liquid-containing portion 423 in the liquid-containing means 406 through the second connection path 405 or the through hole 413 can flow out through the outlet 416 by downward movement of the piston 412 without backwards flowing into the sub-tank 403 through the second connection path 405. The fluid resistant 431 exhibits the abovementioned effects, however such object of the present invention can be sufficiently obtained in such a way that sizes and materials of the second connection path 405, the outlet 418, the inlet 419, the supply port 408 and the supply path 407, the liquid path in the head 404, the ejecting orifice 409, and the like are designed by considering sizes and materials thereof, without depositing the fluid resistant 431.

Figure 5:
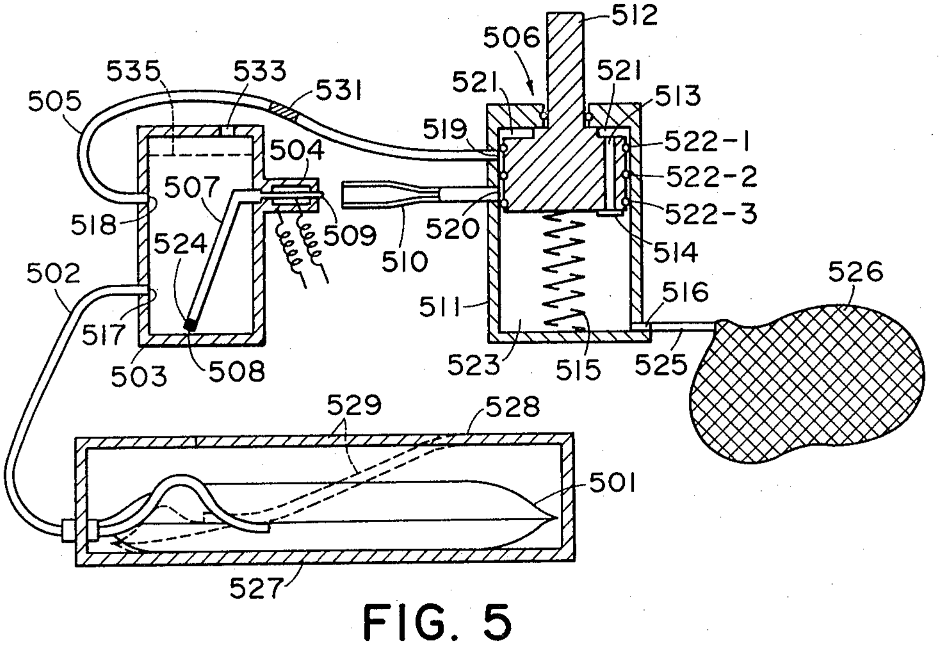
FIG. 5 is a schematic view of the fifth embodiment of the present invention.

FIG. 5 shows schematically the fifth embodiment of the present invention.

In the apparatus shown in FIG. 5, three O-rings are disposed on a piston 512 being a member of a liquid-containing means 506. A second connection path 505 being communicatively connected to a sub-tank 503 through an outlet 518 is connected to the liquid-containing means 506 through an inlet 519 provided upward an inlet 520 so that the sub-tank 503 can be communicatively connected to the upper space region 521 of the liquid-containing means 506. When a piston 512 exists at an upper dead point thereof, the inlets 519 and 520 are blocked from the upper space region 521 with the three O-rings.

The apparatus shown in FIG. 5 is similar to that in FIG. 4 except for operation mechanism based on the above-mentioned points.

A press means 529 in the apparatus shown in FIG. 5 has a construction and function similar to that in FIG. 4. In the apparatus shown in FIG. 5, the press movement of the press means 529 is carried out in combination with a suction movement of a suction mechanism of the liquid-containing means 506 to be described below. Liquid can be effectively and rapidly supplied to the sub-tank 503 and a liquid-jet head 504 by cooperating the press movement and the suction movement. Liquid ejection from the head 504 becomes unstable or unable on account of lack or shortage of the liquid in the sub-tank 503, clogging in a liquid path from a tank 501 to an ejecting orifice 509, excessive regression and unable restoration of the meniscus formed in the vicinity of the ejecting orifice 509 by shock applied from outside of the apparatus, and the like. In these cases, original stable liquid-ejecting state can be more rapidly restored by cooperating the press means 529 and the suction mechanism of the liquid-containing means 506 than by singly operating the press means 529 on the suction mechanism of the liquid-containing means 506.

There will be more concretely described the structure, movements and mechanism of the apparatus shown in FIG. 5.

The sub-tank 503 is provided with a liquid inlet 517, an outlet 518 for sucking air and/or liquid. The liquid inlet 517 is communicatively connected to the tank 501 through a first connection path 502. The outlet 518 is communicatively connected to an inlet 519 of the liquid-containing means 506 through a second connection path 505 which is preferably made of a flexible material. There are disposed an opening 533, a filter 534 and a liquid-surface controlling means 535 above the outlet 518.

In the apparatus shown in FIG. 5, the sub-tank 503 is always connected with the liquid-containing means 506 through the second connection path 505 in the case except for emergency. An inlet 520 provided at the liquid-containing means 506 is communicatively connected to the liquid-receiving means 510. The liquid-receiving means 510 can be joined to the tip portion of the head 504. Liquid is supplied from the tank 501 into the sub-tank 503 by manually pressing the upper end portion of the piston 512 being a member of the liquid-containing means 506 in combination with the press movement of the press means 529 as described on the apparatus shown in FIG. 4, upon downwards moving the piston 512. When the piston 512 is moved downwards, a valve 514 closes a vent 513. Therefore, a space region 521 of a cylinder 511 where exists at upper portion of the piston 512 is brought to a negative pressure. The negative pressure state in the cylinder 511 diminishes the pressure in the sub-tank 503 through the connection path 505 to produce a pressure difference between the pressure in the sub-tank 503 and that in the tank 501 through the first connection path 502. By the pressure difference, the liquid in the tank 501 is acceleratedly moved from the tank 501 to the sub-tank 503. The movement of liquid, of cause, can be carried out only by the abovementioned pressure difference. When the piston 512 is further brought to a position where a position of the O-ring 522-1 comes down to the position lower than the inlet 520, a pressure in a path in the liquid-receiving means 510 is diminished through the inlet 520. At this case, when the liquid-jet head 504 is connected to the liquid-receiving means 510, the liquid in the sub-tank 503 is sucked into the inside of the head 504 on the ground of the pressure difference produced through the liquid-receiving means 510 and the liquid path in the head 504. Accordingly, the liquid is supplied into the liquid path in the head 504. When an amount of liquid introduced into the sub-tank 503 exceeds over the level where the liquid-supplying port 508 provided at the tip of the supply path 507 is at least immersed with the liquid, the liquid can move into the liquid path in the head 504 through the liquid-receiving means 510. Further, when the surface of the liquid supplied into the sub-tank 503 exists in the vicinity of the liquid-supplying port 508, upon supplying liquid in the liquid-jet head 504, a fluid resistance of the first connection path 502 and that of the supply path 507 are so controlled that an amount per unit time of the liquid introduced from the liquid-supplying port 508 to the liquid-jet head 504 becomes smaller than that of the liquid introduced from the tank 501 to the sub-tank 503.

For prevention of gas or bubbles being introduced into the liquid path in the liquid-jet head 504, it is requied to supply liquid into the head 504 after a sufficient amount of liquid is supplied into the sub-tank 503. For this purpose, movement of the piston 512 must be carried out in two step motions. In other words, in the first step motion, the piston 512 is downwards moved so that a position of the O-ring 522-1 may be brought between the inlets 519 and 520. Therefore, the liquid is supplied from the tank 501 to the sub-tank 503 by diminishing the inner pressure of the sub-tank 503 only through the second connection path 505. A degree of negative pressure in the sub-tank 503 which is produced by the first step motion exceeds a degree where liquid is sufficiently supplied into the sub-tank 503. After a sufficient amount of liquid is supplied into the sub-tank 503, the second step motion of downward movement of the piston 512 is carried out. In other words, the piston 512 is downward moved so that a position of the O-ring 522-1 may be brought under the inlet 520. Therefore, a pressure difference is produced between the sub-tank 503 and the liquid-receiving means 510 through the head 504 so that a flow of the liquid is formed in the liquid path in the head 504. Speed of downward movement of the piston 512 during the second step motion, and a time interval between the first and the second step motions, are suitably determined on the ground of design of an apparatus and a press means 529 so that liquid can be desirably supplied to the sub-tank 503 and the head 504, with considering balance between a pressure applied to the liquid in the tank 501 with the press means 529 and the above-mentioned factors: sizes and shapes of the first connection path 502, the second connection path 505, the supply path 507, the liquid inlet 517, the liquid outlet 518, and the liquid-supplying port 508 are designed suitably desirably. In connection with the above, sizes of the inlets 519 and 520 are suitably designed and prepared, thereby downward movement of the piston 512 can be continuously carried out without carrying out in the two step motions. When the surface of the liquid introduced into the sub-tank 503 by downward movement of the piston 512 exceeds upwards the outlet 518, liquid flows into the upper space region 521 in the cylinder 511 through the connection path 505 from the inlet 519. The liquid introduced into the space region 521 then flows into the vent 513 and opens the valve 514 to flow into a space region 523 existing the under portion of the cylinder. When downward movement of the piston 512 extends to the under dead point, the piston 512 can return back its original position under the action of the spring 515. When the piston 512 is raised the valve 514 is opened on account of the pressure difference between the vent 513 and the space region 523. Thereby the upper space region 521 of the cylinder 511 is communicated to the atmosphere through the outlet 516 an outflow path 525 and a liquid-absorbing means 526. When the valve 514 is open the liquid existing in the vent 513 and/or the space region 521 flows into the under space region 523. The piston 512 of the liquid-containing means 506 in the apparatus shown in FIG. 5 is provided with three O-rings 522-1, 522-2 and 522-3 as described previously. When the piston 512 presents at the original position (upper dead point) inlets 519 and 520 are blocked with the piston 512 and these O-rings. If printing is obstructed by regression of the meniscus of the liquid resulting from the loss of the balance caused by clogging in the liquid-jet head 504 or lowering of the surface of the liquid in the sub-tank 503, resulting an operation for restoring printing can be easily carried out in a way similar to that described above.

The operation for restoring printing will be briefly described below.

It is a cause to obstruct printing that an amount of the liquid in the sub-tank 503 is diminished on account of some causes, and that a meniscus of the liquid regresses excessively from the orifice 509 of the liquid-jet head 504 on account of lowering the surface of the liquid in the sub-tank 503. It is another cause to obstruct printing that, in the case of carrying out printing by sliding sidewise the sub-tank 503 with the head 504, the meniscus regresses excessively by shock upon returning and can not be restored to the normal position, thereby liquid droplets are unsteadily ejected or can not be ejected. It is a further cause that bubbles tend to be introduced into the head 504 upon sliding sidewise. It is a still further cause that liquid clogs in the head 504 on account of dry-up of liquid in a liquid path of the head 504 or contamination of liquid with foreign matters.

When printing is hindered with the abovementioned causes, printing can be restored in the following manner.

The liquid-receiving means 510 is joined to the tip end of the liquid-jet head 504 to push the piston 512. As the first step, the O-ring 522-1 is passed the inlet 519, thereby the upper space region 521 of the cylinder 511 is communicatively connected to the sub-tank 503 through the connection path 505 to suck the air in the sub-tank 503 by the negative pressure produced in the cylinder 511. Therefore, liquid is injected from the tank 501 to the sub-tank 503. At this time, since the inlet 520 is blocked by the O-rings 522-2 and 522-3, liquid can not move through the head 504.

When the piston 511 is further moved downwards, as the second step, the O-rings 522-1 and 522-2 are passed the inlet 519. Therefore, the inlet 519 is communicatively connected to the upper space region of the cylinder 511 so that liquid is sucked into the upper space region of the cylinder 511 through the head 504 and the liquid-receiving means 510. At this time, if there is matter which hinders ejection of liquid, the matter is sucked with the liquid into the upper space region 521 of the cylinder. When the piston 512 is raised the matter is discharged into the liquid-absorbing means 526 through the vent 513, the valve 514, the outlet 516, and outflow path 525.

As described above, in the apparatus shown in FIG. 5, when the piston 512 being a member of the liquid-containing means 506 is pushed, the remaining air in the sub-tank 503 is sucked so that liquid is introduced from the tank 501 to the sub-tank 503. After the back end of the supply path in immersed into the liquid, the liquid is sucked through the liquid-jet head 504. As the result, it is prevented that air is introduced into the liquid path in the head 504. Further, is necessary, the surface of the liquid in the sub-tank 503 can be raised to the outlet 518 by repeating push movement of the piston 512. At this situation, the liquid is also sucked through the outlet 518 so that the surface of the liquid in the sub-tank 503 is kept at the level of the outlet 518. At this situation, a constant air layer is present in the upper portion than the outlet 518 of the sub-tank 503.

The air layer serves as an absorber for impact pressure generating upon driving the sub-tank 503.

For controlling flow amounts of the liquid and/or air through the liquid-jet head 504 and those through the second connection path 505, a fluid resistant 531 may be provided in the second connection path 505. The fluid resistant 531 can be made of porous plastics, porous ceramics, glass having fine holes, felts, sponges, orifices, and the like.

It is preferable to mount a filter 524 for removing foreign matter in the supply path 507 or preferably on the liquid-supplying port 508 so that the filter can prevent non-fluidal foreign matter existing in the liquid of the sub-tank 503 from invading into the liquid path in the head 504 and clogging the liquid path, and control a fluid resistance of the supply path 507.

Figure 6:
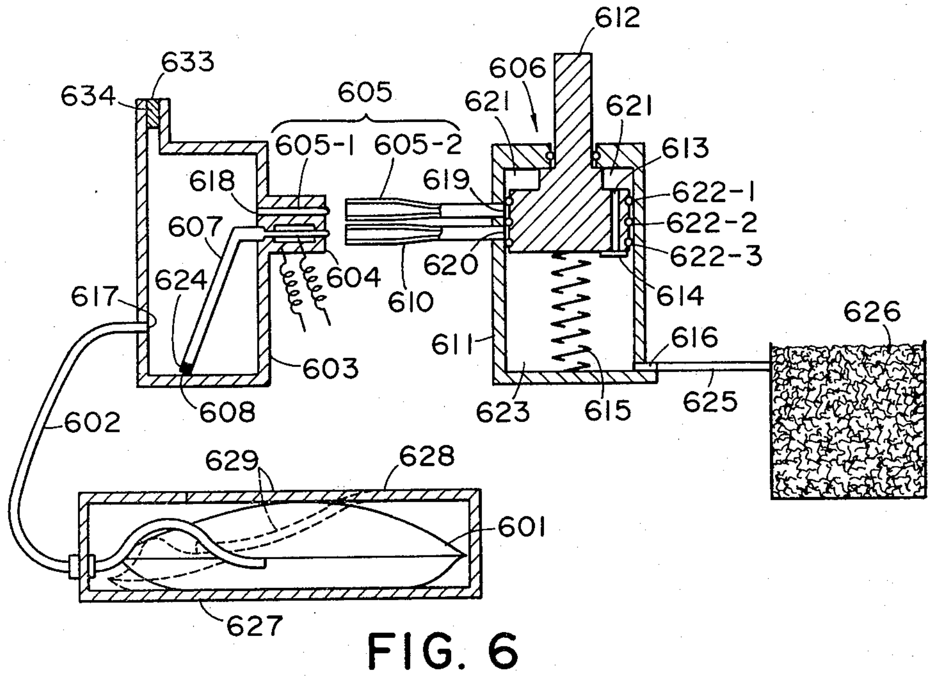
FIG. 6 is a schematic view of the sixth embodiment of the present invention.

FIG. 6 shows the sixth embodiment according to the present invention.

The structure and function of this embodiment is essentially similar to those of the embodiment shown in FIG. 5 except that this embodiment is separably provided with the second connection path shown in FIGS. 4 and 5. Accordingly, in FIG. 6, those components designated by the same numerals in the lower two places in FIGS. 1–5 are identical with those components in FIGS. 1–5. The separable second connection path 505 is constructed with a section 605-1 of a connection path on a sub-tank 603 and a section 605-2 of a connection path on a liquid-introducing means 606. The section 605-1 of the connection path is provided with a projection having an opening at the tip end to be easily capped with the section 605-2. The section 605-2 of the connection path has a construction similar to a liquid-receiving means 610 to which the section 605-1 can be easily inserted. It is desirable that the section 605-1 has the same construction and the same size as that of a liquid-jet head 604 for cutting costs by reducing types of parts. Junction between sections 605-1 and 605-2 is preferably carried out with junction between the head 604 and the liquid-receiving means 610 for simplifying an operation mechanism and securing practice of operation, before a carriage loading the sub-tank 603 and the recording head 604 stops at the predetermined position and liquid-introducing operation in the liquid-introducing means 606 is carried out. The size and construction of section 605-1 of the joining path is suitably determined to function as following. For example, junction between sections 605-1 and 605-2, for simplifying an operation mechanism and securing practice of operation, is preferably carried out with junction between the head 604 and the liquid-receiving means 610. The latter junction is carried out immediately after a carriage loading the sub-tank 603 and the head 604 stops at the predetermined position or in the course of stopping operation of the carriage. Sizes of the opening of section 605-1 of the joining path and the opening 633, and constitution of the tip of section 605-1 of the joining path are suitably determined so that the section 605-1 of the connection path and the opening 633 can serve as vents against sudden and hard change of inner pressure in the sub-tank 603 in the extent that printing is subjected to inverse influence, and so that the surface tensions at the opening of tip of the section 605-1 of the connection path and opening 633 can prevent leakage of liquid upon moving such as transporting the apparatus. If necessary, a filter 634 may be disposed similarly to the case of FIG. 4.

Figure 7:
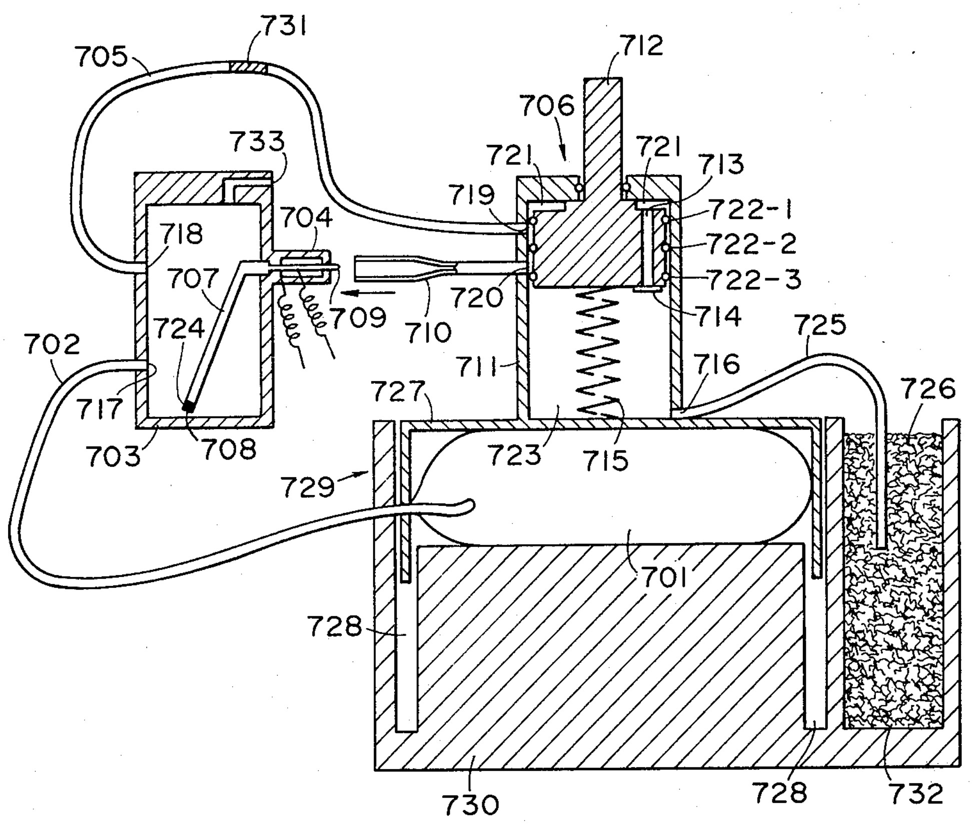
FIG. 7 is a schematic view of the seventh embodiment of the present invention.

FIG. 7 shows the seventh embodiment of the present invention. The apparatus of this embodiment is provided with a press means which is a modification of the press means in FIG. 5. By pushing a piston 712 being a member of a liquid-containing means 706 can be carried out pressing a liquid in a tank 701 as well as sucking contents of a sub-tank 703 through a second connection path 705 at one stroke.

A press means 729 of the apparatus shown in FIG. 7 comprises an underwards concave upper-cover 727 having a hollow for inside containing the tank 701, and a base 730 having a guide groove 728 in which the peripheral side wall of the upper-cover 727 is allowed to move. The upper section of the upper-cover 727 is formed in one body with the bottom section of the liquid-containing means 706. The baglike tank 701 is contained in a space formed with the upper-cover 727 and the base 730 as shown in FIG. 7. At the extreme right of the base 730, there is a concavity 732 for containing a liquid-absorbing liquid absorber 726 where the effluent liquid from the liquid-containing means 706 is contained to evaporate spontaneously or forcedly. A liquid in an under space region 723 of the liquid-containing means 706 is absorbed into the liquid absorber 726 through an outflow path 725 which is communicatively connected with an outlet 716 disposed at the under portion of the liquid-containing means 706.

In the apparatus having the constitution shown in FIG. 7, supply of liquid to the sub-tank 703 and/or a liquid-jet head or restoring of the liquid ejecting function 704 are carried out by pressing a piston 712 being a member of the liquid-jet head 706 against a repelling power of a spring 715. In other words, upon pressing downwards the piston 712, an inertia of an upper space region 721 is brought to a negative pressure by a relative drop of the piston 712 in a cylinder 711. When the piston 712 is brought to a position where a position of the O-ring 722-1 becomes down an inlet 719, an upper space region 721 is communicatively connected to the sub-tank 703 through a second connection path 705 so that the contents of the sub-tank 703 is sucked. Since the base 730 is fixed, a pressing power applied to the piston acts on the tank 701 through the upper-cover 727 so that the liquid in the tank 701 is pressed simultaneously with the abovementioned suction. The liquid in the tank 701 is supplied into the sub-tank 703 through a first connection path 702 by pressing the liquid in the tank 701. When the piston 712 is further brought to a position where a position of the O-ring 722-1 comes down to the portion lower than an inlet 720, the liquid in the sub-tank is suctionwise supplied into the liquid path in the liquid-jet head 704 by the suction power through a liquid-receiving means 710 as described on FIG. 5.

As described above, in the apparatus shown in FIG. 7, suction of liquid into the sub-tank 703 by the suction mechanism of the liquid-containing means 706 is carried out with the press down movement of the piston 712 simultaneously with press down movement of the tank 701 with a press means, therefore liquid-supplying operation or an operation for restoring the liquid-ejection function.

In FIG. 7, those components designated by the same numerals in the lower two places in FIGS. 1–6 are identical with those components in FIGS. 1–6. A further embodiment according to the present invention will be described with reference to FIG. 8.

Figure 8A:
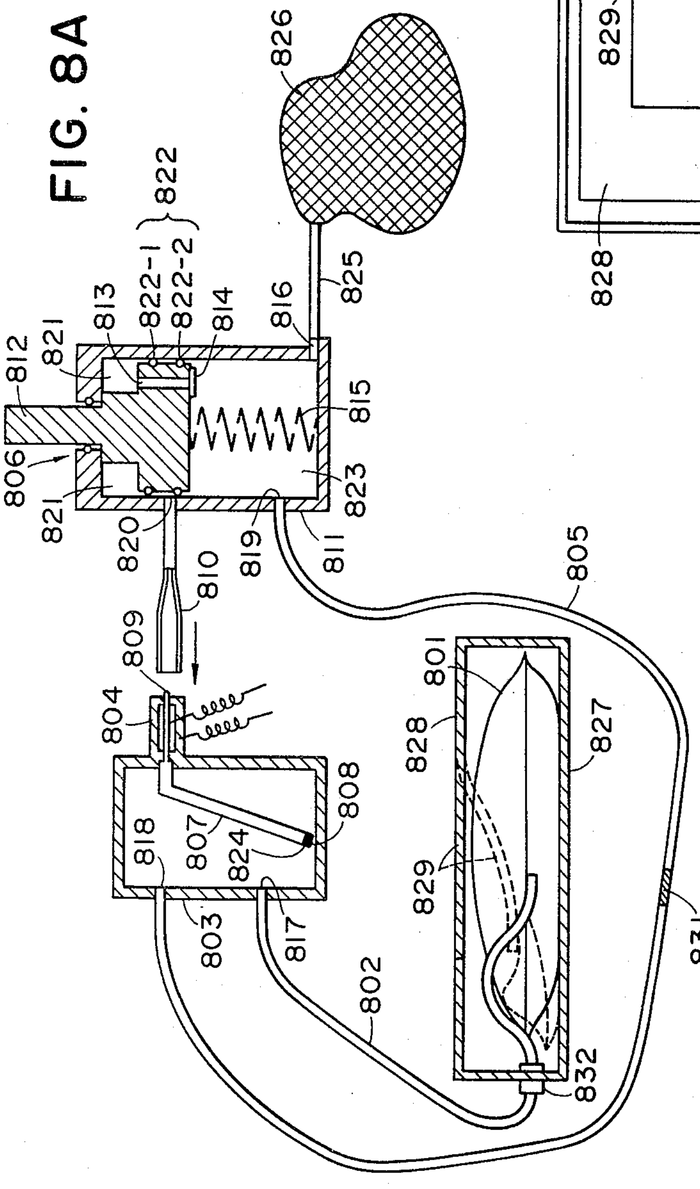
FIG. 8A is a schematic view of the eighth embodiment of the present invention.
Figure 8B:
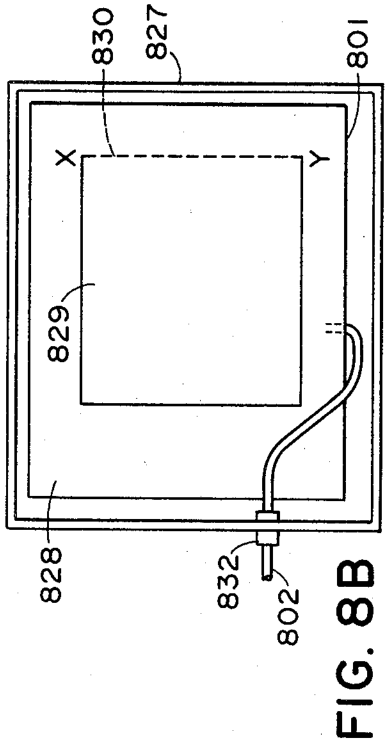
FIG. 8B is a schematic plane view of the cassette shown in FIG. 8A.

A liquid-jet apparatus shown in FIGS. 8A and 8B comprises a first tank 801 containing liquid for recording, so-called "ink", a sub-tank 803 connected with the tank 801 through a first connection path 802, a liquid-jet head 804 which is integrated with the sub-tank 803, and a liquid-containing means which is communicatively connected to the sub-tank 803 through a second connection path 805.

The liquid-containing means 806 comprises a liquid-receiver 823 at under portion thereof which is a space region for temporally containing liquid, and the liquid-receiver 823 is communicatively connected through an inlet 819 with the second connection path 805 which is communicatively connected to an outlet 818 provided at the upper portion of the sub-tank 803. The liquid-containing means 806 comprises a suction mechanism by which the inside of the sub-tank 803 is brought to a negative pressure through the connection path 805 to enhance liquid feeding to the sub-tank 803 from the first tank 801. The negative pressure state is produced by pressure difference which is formed by actuating the suction mechanism of the liquid-introducing means 806 between the sub-tank 803 and the liquid-introducing means 806 through the connection path 805. The degree of the negative pressure and time for keeping the negative pressure state are set so that a desired quantity of liquid may be smoothly supplied through the connection path 802 from the tank 801 to the sub-tank 803.

The second sub-tank 803 is communicatively connected with a supply port 808 for supplying liquid into the head 804. The liquid contained in the sub-tank 803 is supplied from the supply port 808 to the head 804 through a supply path 807, which communicatively connects the supply port 808 with the liquid path in the head 804.

In the apparatus shown in FIG. 8A, the supply path 807 is disposed in the sub-tank 803 as a component of the sub-tank 803. It is required to dispose such supply path in case that the inlet of the head 804 is positioned far apart upwards from the supply port 808 as shown in FIG. 8A. Therefore, where the inlet of the head 804 is disposed in the vicinity of bottom of the sub-tank 803, the supply port 808 may be directly disposed on the wall surface of the sub-tank 803 without disposing the supply path 807.

It is desirable that the supply path 807 is disposed as shown in Figure, that the supply port 808 is located at the bottom of the sub-tank 803, and that the recording head 804 is disposed at an upper portion of the sub-tank 803, to obtain good printing characteristics, stable supplying of liquid into the head 804, and ability to sufficiently use liquid contained in the sub-tank 803.

In other words, the supply portion 808 is positioned in the vicinity of bottom of the sub-tank 803, a liquid inlet for the liquid-jet head 804 is disposed on the upper side wall of the sub-tank, and the supply path 807 communicatively connects the supply port 808 with the liquid inlet. The supply path 807 may be joined to the back end (end section of upstream side) of liquid path in the liquid-jet head 804, or alternatively formed by extending the liquid path in the head 804.

On the supply port 808 or the supply path 807, it is preferably disposed a filter 824 where liquid is passed easily and bubbles can be prevented from passing so as to prevent invading of bubbles into the liquid path in the liquid-jet head 804 upon use. Examples of the filter 824 having such function, for example, include a porous material having a number of fine through holes, fibrous materials such as felt, and the like. The the supply path 807 may be composed of most materials being capable of smoothly passing liquid and being free from undesirable interaction with liquid to be supplied. Representative materials which can be effectively used in the present invention are tubes of materials such as glass, plastics, and the like. Preferable plastics are polyethylene, polyvinylidene chloride, polyvinylidene fluoride, polyester, polyvinyl chloride, and the like.

An outlet 818, which connects communicatively between the second connection path 815 and the sub-tank 803 is located at a higher position above the inlet 817 along the side wall of the sub-tank and maintained at a predetermined distance from the top of the wall of the sub-tank 803 in order to provide an air layer above the liquid.

The air layer formed in the highest portion of the sub-tank 803 has the ability to relax pressure change generating in the case where the sub-tank 803 repeats movement, e.g., sidewise sliding while ejecting liquid from the liquid-jet head 804. This point will be described later in detail.

To the under portion of liquid-containing means 806 is communicatively connected one end of the second connection path 805 which is a liquid path between 806 and the sub-tank 803. Above the position where the second connection path 805 is connected to 806 it is disposed a liquid-receiving means 810 which can be connected to an ejecting orifice 809 of the liquid-jet head 804 which forms flying liquid droplets in order to receive the liquid ejected from the orifice 809. The liquid-receiving means 810 is made of a hollow tube and communicatively connected to the liquid-containing means 806 at a liquid inlet 820 so that 810 may be brought to a suction state by actuation of the suction mechanism of the liquid-containing means 806. The tip of the liquid-receiving means 810 has a shape and construction capable of connecting with the tip of the head 804 so as to diminish a pressure of the liquid path in the liquid-jet head 804. The suction mechanism of the liquid-containing means shown in FIG. 8A possesses a suction pump construction which comprises a cylinder 811 being an outside frame for the suction pump and a piston 812. The piston 812 is provided with a through hole 813. A valve 814 is mounted on the lower end opening of the through hole 813. Two O-rings 822 are disposed between the inner wall of the cylinder 811 and the outer wall of the piston. Each of two O-rings is fitted to each of grooves disposed on the periphery of the piston 812 in such a way that the ring tightens the piston 812, respectively. The piston 812 is normally present in the state where the piston is pushed up at the upper portion of the cylinder 811 to form an upper space 812 by a spring 815 of which, if necessary, an end if fixed on the bottom of the cylinder 811. An outlet 816 is disposed at the bottom of the cylinder 811 so that the liquid sucked into the liquid-containing means 816 may flow out toward outside. To the outlet 806 is connected a liquid-absorbing means 826 where the liquid flowed out through an outflow path is absorbed and spontaneously evaporated. Such liquid-absorbing means 826 can be typically made of so-called sponge, porous material, felts, and the like. Alternatively, at the downstream of the outlet may be disposed a tank for containing an outflow liquid so as to contain the outflow liquid into the tank. When the volume of the lower part the cylinder 811 is sufficiently large, the outlet 816 is not always necessarily disposed. There may be disposed a fine hole capable of opening to the atmosphere. Of course, it is not required to provide the outflow path 825 and the liquid-absorbing means 826.

In the apparatus shown in FIGS. 8A and 8B, the tank 801 is a kind of bag capable of freely changing volume which is made of plastic sheets, rubbers, metal foils, films, and the like. The tank is placed in a cassette 827 of a hard case so that the tank 801 may be easily set in the predetermined position and prevented from an impact or a break resulting from the external cause.

One end of the first connection path 802 is inserted into the tank 801 so that the liquid contained in the tank 801 may be smoothly supplied into the sub-tank 803. In order that the first connection path 802 connects the tank 801 with the sub-tank 803, the connection path 802 may be communicatively connected at an opening member 832 or prepared in a continuous tube which passes through the opening member 832. In the cassette 827, there is provided a press means 829 which is formed by three cuts in a nearly central position of the upper cover 828 of the cassette 827 in which the tank 801 is placed. The press means 829 presses downwards the tank 801 as follows. When the press means 829 is pushed downwardly with finger etc., it bends to inside (bending state is shown by the dotted line) of the cassette 827 along the dotted line 830 (X-Y line). The liquid contained in the tank 801, therefore, is pushed toward the first connection path 802 depending on the abovementioned movement. At this time, a pressure difference is produced between the tank 801 and the sub-tank 803, therefore, the liquid is smoothly introduced from the tank 801 to the sub-tank 803. By pressing action of the press means 829, the liquid pushed out from the tank 801 flows into the sub-tank 803 through the first connection path 802 to supply the predetermined amount of liquid into the sub-tank 803. When the pressing action of the press means 829 for supplying liquid into the tank 801 is sufficiently large, the surface of the liquid introduced into the sub-tank 803 extends to the position of the outlet 818, subsequently the liquid flows from the outlet 818 to flow into the liquid-containing portion 823 of the liquid-containing means 806. The movement of the press means 829 may be carried out manually or electrically by using a solenoid.

When the liquid is introduced into the sub-tank 803 over the level where the supply port 808 is at least immersed with the inflow liquid, the liquid can move into the liquid path in the head 804 by suction of the liquid through the liquid-receiving means 810 connected with the ejecting orifice 809 present at the tip of the liquid-jet head 804. The suction is caused by the actuation of suction mechanism of the liquid-containing means 806. The suction may be cooperated with the press or independently applied provided that liquid exists sufficiently in the sub-tank 803.

For more effectively utilizing the operation for liquid-supplying and for recovering the liquid ejection, it is preferable that the press and the suction movement are used simultaneously after a sufficient amount of the liquid is supplied into the sub-tank 803.

The press means 829 may be constructed with a flexible plate formed by cutting a portion of the upper cover 828 of the cassette 827 as shown in FIG. 8B, or alternatively, may be cooperated with such means capable of applying press as springs, pistons, plungers, and the like.

In the second connection path 805 is disposed a fluid resistant 831 to control difference in an amount per unit time of the liquid in the liquid path between a liquid in the liquid-jet head 804 and that in the second connection path 805.

The fluid resistant 831 is disposed so that an outlet amount of the liquid through the supply port 808 may become sufficiently larger than that of the liquid through the outlet 818, for the purpose of recovering smoothly printing resulting from smoothly and effectively supplying the liquid into the liquid-jet head 804 and effectively sucking the liquid contained in the sub-tank 803 through the liquid path in the head 804 by suction force through the liquid-receiving means 810. The fluid resistant 831 serves to control the fluid resistance of the second connection path 805 so that the liquid flowing into the liquid-containing portion 823 in the liquid-containing means 806 through the second connection path 805 or the through hole 813 may flow out through the outlet 816 by downward movement of the piston 812 without backwards flowing into the sub-tank 803 through the second connection path 805. The fluid resistant 813 exhibits the abovementioned effects, however such object of the present invention can be sufficiently obtained in such a way that sizes and materials of the second connection path 805, the outlet 818, the inlet 819, the supply port 808 and the supply path 807, the liquid path in the head 804, the ejecting orifice 809, and the like are designed by considering sizes and materials thereof, without depositing the fluid resistant 831.

Figure 9:
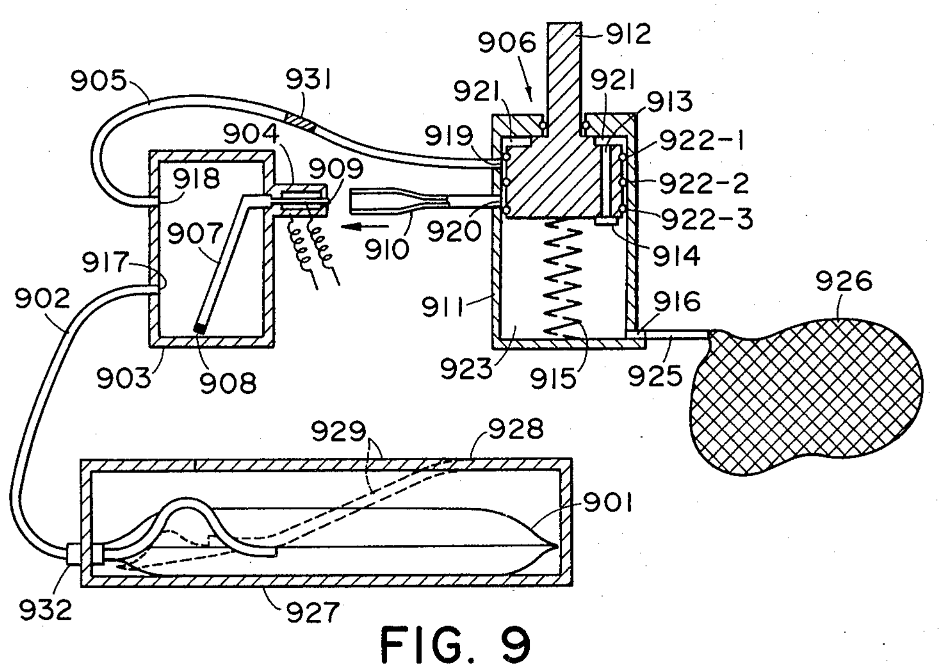
FIG. 9 is a schematic view of the ninth embodiment of the present invention.

FIG. 9 shows schematically the ninth embodiment of the present invention.

While the apparatus shown in FIG. 8, shows that a liquid inlet 820 is closed with two O-rings at a dead point of the piston 812, and liquid inlet 819 is always opened to the lower space region 823 of the liquid-containing means 806, the apparatus in FIG. 9 is explained below.

In the apparatus shown in FIG. 9, three O-rings are disposed on a piston 912 being a member of a liquid-containing means 906. A second connection path 905 being communicatively connected to a sub-tank 903 through an outlet 918 is connected to the liquid-containing means 906 through an inlet 919 provided upward an inlet 920 so that the sub-tank 903 may be communicatively connected to the upper space region 921 of the liquid-containing means 906. When a piston 912 exists at an upper dead point thereof, the inlets 919 and 920 are blocked from the upper space region 921 with the three O-rings.

The apparatus shown in FIG. 9 is similar to that in FIG. 8 except for operation mechanism based on the above-mentioned points.

A press means 929 in the apparatus shown in FIG. 9 has a construction and function similar to that in FIG. 8. In the apparatus shown in FIG. 9, the pressing movement of the press means 929 is carried out in combination with a suction movement of a suction mechanism of the liquid-containing means 906 to be described below. Liquid can be effectively and rapidly supplied to the sub-tank 903 and a liquid-jet head 904 by cooperating the pressing and the suction movement. Liquid ejection from the head 904 becomes unstable or unable because of lack or shortage of the liquid in the sub-tank 903, clogging in a liquid path from a tank 901 to an ejecting orifice 909, excessive regression and unable restoration of the meniscus formed in the vicinity of the ejecting orifice 909 by shock applied from outside of the apparatus, and the like. In these cases, original stable liquid-ejecting state can be more rapidly restored by cooperating the press means 929 and the suction mechanism of the liquid-containing means 906 than by singly operating the press means 929 or the suction mechanism of the liquid-containing means 906.

There will be more concretely described for the structure, movements and mechanism of the apparatus shown in FIG. 9.

The second sub-tank 903 is provided with a liquid inlet 917, an outlet 918 for sucking air and/or liquid. The liquid inlet 917 is communicatively connected to the tank 901 through a first connection path 902. The outlet 918 is communicatively connected to an inlet 919 of the liquid-containing means 906 through a second connection path 905 which is preferably made of flexible material.

In the apparatus shown in FIG. 9, the second sub-tank 903 is always connected with the liquid-containing means 906 through the second connection path 905 in the case except for emergency. An inlet 920 provided at the liquid-containing means 906 is communicatively connected to the liquid-receiving means 910. The liquid-receiving means 910 can be joined to the tip portion of the head 904. Liquid is supplied from the tank 901 into the sub-tank 903 by manually pressing the upper end portion of the piston 912 being a member of the liquid-containing means 906 in combination with the press movement of the press means 929 as described on the apparatus shown in FIG. 8, upon downwards moving the piston 912. When the piston 912 is moved downwards, a valve 914 closes a vent 913. Therefore, a space region 921 of a cylinder 911 above the piston 912, which is upper part of the cylinder 911, is brought into a negative pressure. The negative pressure state in the cylinder 911 diminishes the pressure in the sub-tank 903 through the connection path 905 to produce a pressure difference between the pressure in the sub-tank 903 and in the tank 901 through the first connection path 902. By the pressure difference, the liquid in the tank 901 is acceleratedly moved from the tank 901 to the sub-tank 903. The movement of liquid, of course, can be carried out only by the abovementioned pressure difference. When the piston 912 is further moved to a position where a position of the O-ring 922-1 comes down to the position lower than the inlet 920, a pressure in a path in the liquid-receiving means 910 is diminished through the inlet 920. At this time, if the liquid-jet head 904 is connected to the liquid-receiving means 910, the liquid in the sub-tank 903 is sucked into the inside of the head 904 according to the pressure difference produced through the liquid-receiving means 910 and the liquid path in the head 904. Accordingly, the liquid is supplied into the liquid path in the head 904. When an amount of the liquid introduced into the sub-tank 903 exceeds the level when the liquid-supplying port 908 provided at the tip of the supply path 907 is at least immersed in the liquid, the liquid can move into the liquid path in the head 904 through the liquid-receiving means 910. Further, when the surface of the liquid supplied into the sub-tank 903 exists in the vicinity of the liquid-supplying port 908, upon supplying liquid in the liquid-jet head 904, a fluid resistance of the first connection path 902 and that of the supply path 907 are so controlled that an amount per unit time of the liquid introduced from the liquid-supplying port 908 to the liquid-jet head 504 becomes smaller than that of the liquid introduced from the tank 901 to the second sub-tank 903.

For prevention of gas or bubbles being introduced into the liquid path in the liquid-jet head 904, it is required to supply liquid into the head 904 after a sufficient amount of liquid is supplied into the sub-tank 903. For this purpose, movement of the piston 912 must be carried out in two step motions. In other words, in the first step motion, the piston 912 is downwards moved so that a position of the O-ring 922-1 may be brought between the inlets 919 and 920. Consequently, the liquid is supplied from the tank 901 to the sub-tank 903 by diminishing the inner pressure of the sub-tank 903 only through the second connection path 905. A degree of negative pressure in the sub-tank 903 which is produced by the first step motion exceeds a degree where liquid is sufficiently supplied into the sub-tank 903. After a sufficient amount of liquid is supplied into the sub-tank 903, the second step motion of downward movement of the piston 912 is carried out. In other words, the piston 912 is downwards moved so that a position of the O-ring 922-1 may be brought under the inlet 920. Therefore, a pressure difference is produced between the sub-tank 903 and the liquid-receiving means 910 through the head 904 so that a flow of the liquid may be formed in the liquid path in the head 904. Speed of downward movement of the piston 912 during the second step motion, and a time interval between the first and the second step motions, are suitably determined depending on the design of an apparatus and a press means 929 so that liquid may be desirably supplied to the sub-tank 903 and the head 904, with considering the balance of liquid pressure applied to the liquid in the tank 901 with the press means 909. Sizes and shapes of the first connection path 902, the second connection path 905, the supply path 907, the liquid inlet 917, the liquid outlet 918, and the liquid-supplying port 908 are designed suitably desirably. In connection with the above, sizes of the inlets 919 and 920 are suitably designed and prepared, thereby downward movement of the piston 912 can be continuously carried out without carrying out in the two step motions. When the surface of the liquid introduced in the sub-tank 903 by downward movement of the piston 912 exceeds above the outlet 918, liquid flows into the upper space region 921 in the cylinder 911, through the connection path 905 from the inlet 919. The liquid introduced into the space region 921 then flows into the vent 913 and opens the valve 914 to flow into a space region 923 existing the under portion of the cylinder 911. When downward movement of the piston 912 reaches to the dead point, the piston 912 can return back its original position with the aid of the spring 915. When the piston 912 is raised the valve 914 is opened on account of the pressure difference between the vent 913 and the space region 923. Thereby the upper space region 921 of the cylinder 911 is communicated to the liquid-absorbing means 926 through the outlet 916 and outflowing path 925. When the valve 914 is open the liquid existing in the vent 913 and/or the space region 921 flows into the lower space region 923. The piston 912 of the liquid-containing means 906 in the apparatus shown in FIG. 9 is provided with three O-rings 922-1, 922-2 and 922-3 as described previously. When the piston 912 presents at the original position (upper dead point) inlets 919 and 920 are blocked with the piston 912 and these O-rings. If the printing is obstructed by regression of the meniscus of the liquid resulting from the unbalance caused by clogging in the liquid-jet head 904 or lowering of the surface of the liquid in the sub-tank 903, an operation for restoring printing can be easily carried out in a way similar to that described above.

The operation for restoring printing will be briefly described below.

Firstly it is a cause to obstruct printing that an amount of the liquid in the sub-tank 903 is diminished on account of some causes, and that a meniscus of the liquid regresses excessively from the orifice 909 of the liquid-jet head 904 on account of lowering the surface of the liquid in the sub-tank 903. Secondly, it is another cause to obstruct printing that, in the case of carrying out printing by sliding sidewise the sub-tank 903 with the head 904, the meniscus regresses excessively by shock upon returning and can not be restored to the normal position, thereby liquid droplets are unsteadily ejected or can not be ejected. Thirdly, it is a further cause that bubbles tend to be introduced into the head 904 upon sliding sidewise. Fourthly, it is a still further cause that liquid clogs in the head 904 on account of dry-up of liquid in a liquid path of the head 904 or contamination of liquid with foreign matters.

When printing is hindered with the abovementioned causes, printing can be restored in the following manner.

The liquid-receiving means 910 is joined to the tip end of the liquid-jet head 904 to push the piston 912. As the first step, the O-ring 922-1 is passed the inlet 919, thereby the upper space region 921 of the cylinder 911 is communicatively connected to the sub-tank 903 through the connection path 905 to such the air in the sub-tank 903 by the negative pressure produced in the cylinder 911. Therefore, liquid is injected from the tank 901 to the sub-tank 903. At this time, since the inlet 920 is blocked by the O-rings 922-2 and 922-3, liquid can not move through the head 904.

When the piston 911 is further moved downwards, in the second step, the O-rings 922-1 and 922-2 are passed away from the inlet 919. Therefore, the inlet 919 is communicatively connected to the upper space region of the cylinder 911 so that liquid may be sucked into the upper space region of the cylinder 911 through the head 904 and the liquid-receiving means 910. At this time, if there is matter which hinders ejection of liquid, the matter is sucked with the liquid into the upper space region 921 of cylinder. When the piston 912 is raised the matter is discharged into the liquid-absorbing means 926 through the vent 913, the valve 914, the outlet 916 and outflow path 925.

As described above, in the apparatus shown in FIG. 9, when the piston 912 being a member of the liquid-containing means 906 is pushed, the remaining air in the sub-tank 903 is sucked so that liquid may be introduced from the tank 901 to the sub-tank 903. After the back end of the supply path is immersed into the liquid, the liquid is sucked through the liquid-jet head 904. As the result, it is prevented that air is introduced into the liquid path in the head 904. Further, if necessary, the surface of the liquid in the sub-tank 903 can be raised as high as outlet 918 by repeating pushing movement of the piston 912. At this situation, the liquid is also sucked through the outlet 918 so that the surface of the liquid in the sub-tank 903 may be kept at the level of the outlet 918. Under these conditions a constant air layer is present in the upper portion above the outlet 918 of the sub-tank 903.

The air layer serves as a shock-absorber for impact pressure generating upon driving the sub-tank 903.

For controlling flow amounts of liquid and/or air through the liquid-jet head 904 and those through the second connection path 905, a fluid resistant 931 may be provided in the second connection path 905. The fluid resistant 931 can be made of porous plastics, porous ceramics, glass having fine cavities, felts, sponges, orifices, and the like.

It is preferable to mount a filter for removing foreign matter in the supply path 907 or preferably on the liquid-supplying port 908 so that the filter may prevent non-fluidal foreign matter existing in the liquid of the sub-tank 903 from invading into the liquid path in the head 904 to clog the liquid path, and may control a fluid resistance of the supply path 907.

Figure 10:
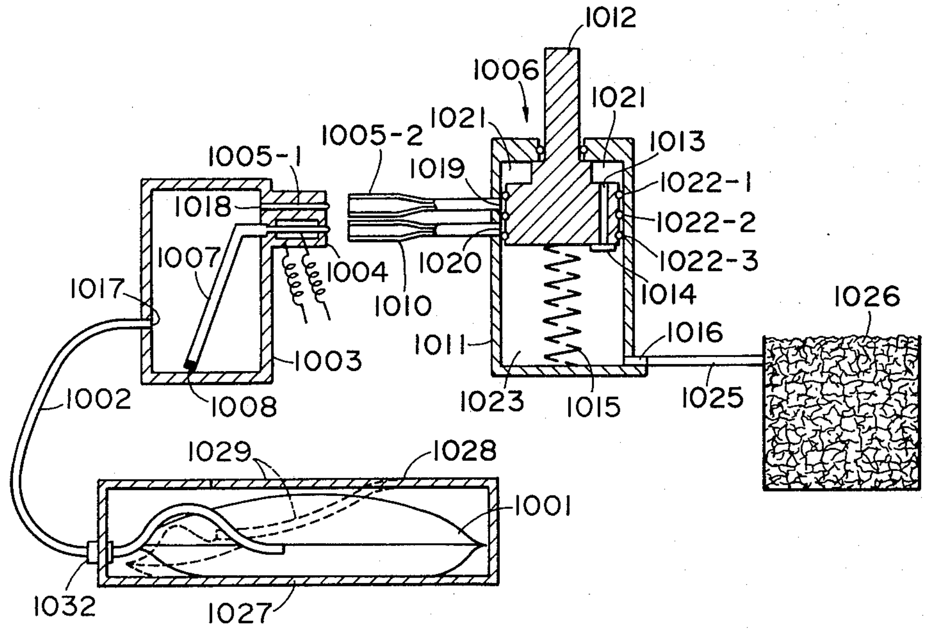
FIG. 10 is a schematic view of the tenth embodiment the present invention.

FIG. 10 shows the tenth embodiment according to the present invention.

The structure and function of this embodiment is substantially similar to those of the embodiment shown in FIG. 9 except that the second connection pathes shown in FIGS. 8 and 9 are separably provided. The separable second connection path 1005 is constructed with a section 1005-1 of a connection path on a sub-tank 1003 and a section 1005-2 of a connection path on a liquid-containing means 1006. The section 1005-1 of the connection path is provided with a projection having an opening at the tip end to be easily capped with the section 1005-2. The section 1005-2 of the connection path has a construction similar to a liquid-receiving means 1010 to which the section 1005-1 can be easily inserted. It is desirable that the section 1005-1 has the same construction and the same size as that of a liquid-jet head 1005 for deducting costs by reducing types of parts. Junction between sections 1005-1 and 1005-2 is preferably carried out with junction between the head 1004 and the liquid-receiving means 1010 for simplifying an operation mechanism and securing practice of operation, before a carriage loading the sub-tank 1003 and the recording head 1004 stops at the predetermined position and liquid-introducing operation in the liquid-introducing means 1004 is carried out. The size and construction of section 1005-1 of the joining path is suitably determined to function as following. For example, junction between sections 1005-1 and 1005-2, for simplifying an operation mechanism and securing practice of operation, is preferably carried out with junction between the head 1004 and the liquid-receiving means 1010. The latter junction is carried out immediately after a carriage loading the sub-tank 1003 and the head 1004 stops at the predetermined position or in the course of stopping operation of the carriage. Sizes of the opening of section 1005-1 of the joining path and the opening 1033, and constitution of the tip of section 1005-1 of the joining path are suitably determined so that the section 1005-1 of the connection path and the opening 1033 may serve as vents against sudden and hard change of inner pressure in the sub-tank 1003 in the extent that printing is subjected to inverse influence, and so that the surface tensions at the opening of tip of the section 1005-1 of the connection path and the opening 1033 may prevent leakage of liquid upon moving such as transporting the apparatus.

Figure 11:
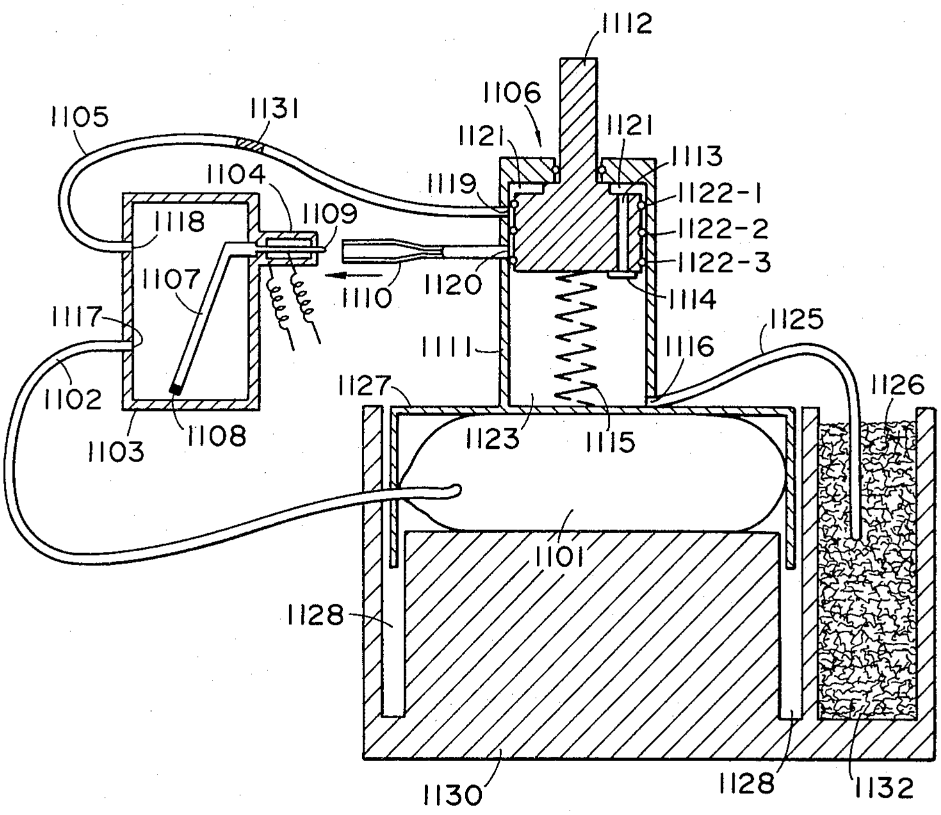
FIG. 11 is a schematic view of the eleventh embodiment of the present invention.

FIG. 11 shows the eleventh embodiment of the present invention. The apparatus of this embodiment is provided with a press means which is a modification of the press means in FIG. 9. By pushing a piston 1112 being a member of a liquid-containing means 1106 can be carried out pressing a liquid in a tank 1011 as well as sucking contents of a sub-tank 1103 through a second connection path 1105 at one stroke.

A press means 1129 of the apparatus shown in FIG. 11 comprises an underwards concave upper-cover 1127 under which a hollow is maintained to receive 1101, and a base 1130 having a guide groove 1128 in which the peripheral side wall of the upper-cover 1127 is allowed to move. The upper section of the upper-cover 1127 is formed in one body with the bottom section of the liquid-containing means 1106. The baglike tank 1101 is contained in a space formed with the upper-cover 1127 and the base 1130 as shown in FIG. 11. At the right end of the base 1130, there is a concavity 1132 for containing a liquid-absorbing liquid absorber 1126 wherein the effluent liquid from the liquid-containing means 1106 is contained to evaporate spontaneously or forcedly. A liquid in an under space region 1123 of the liquid-containing means 1106 is absorbed into the liquid absorber 1126 through an outflow path 1125 which is communicatively connected with an outlet 1116 disposed at the under portion of the liquid-containing means 1106.

In the apparatus having the constitution shown in FIG. 11 supply of liquid to the sub-tank 1103 and/or a liquid-jet head restoring of the liquid ejecting function 1104 are carried out by pressing a piston 1112 being a member of the liquid-jet head 1106 against a repelling power of a spring 1115. In other words, upon pressing downwards the piston 1112, an interior of an upper space region 1121 is brought to a negative pressure by a relative drop of the piston 1112 in a cylinder 1111. When the piston 1112 is brought to a position where a position of the O-ring 1122-1 becomes down to the portion lower than an inlet 1119, an upper space region 1121 is communicatively connected to the sub-tank 1103 through a second connection path 1105 so that the contents of the sub-tank 1103 may be sucked. Since the base 1130 is fixed, a pressing power applied to the piston acts on the tank 1101 through the upper-cover 1127 so that the liquid in the tank 1101 may be pressed simultaneously with the abovementioned suction. The liquid in the tank 1101 is supplied into the sub-tank 1103 through a first connection path 1102 by pressing the liquid in the tank 1101. When the piston 1112 is further brought to a position where a position of the O-ring 1122-1 comes down to the portion lower than an inlet 1120, the liquid in the sub-tank is suctionwise supplied into the liquid path in the liquid-jet 1104 by the suction power through a liquid-receiving means 1110 as described on FIG. 9.

As described above, in the apparatus shown in FIG. 11, suction of liquid into the sub-tank 1103 by the suction mechanism of the liquid-containing means 1106 is carried out with the press down movement of the piston 1112 simultaneously with press down movement of the tank 1101 with a press means, therefore liquid-supplying operation or an operation for restoring the liquid-ejection function easily.

It may be understood that in FIGS. 9 to 11 those components designated by the same numerals in the lower two places in FIG. 8 are identical with those in FIG. 8.

As described in the above embodiments, the apparatus according to the present invention is free from suction of air into a head, and can surely accomplish restoration of printing, and supply of liquid into a sub-tank and the head. Further, it is possible to manufacture the apparatus compactly and at lower cost since the apparatus possesses no complicated mechanism. The apparatus according to the present invention possesses advantages mentioned later herein in addition to the abovementioned characteristics. In other words, in general, supply of liquid into a sub-tank is stopped because of resistance to a lowering of an inner pressure of a tank which is generated by a decrease of an amount of the liquid in the tank. However, in the apparatus according to the present invention, the sub-tank is provided with a vent, and liquid can be supplied from the tank to the sub-tank by using a press means, a suction mechanism of a liquid-containing means, or them at the same time. Therefore, in case that interruption of supply of liquid from the tank occurs frequently, it can be easily perceived that the remainder of the liquid in the tank is scarce, that is, the tank must shortly be changed or liquid must shortly be supplied into the tank. Further, the liquid can be used without waste, since it is sufficiently possible that the liquid is transferred from the tank to the sub-tank without the remainder.

Embodiments of FIGS. 1–7 show only a type of a liquid-jet head having one ejecting orifice, however the present invention can be applied to a so-called multi-orifice type of a liquid-jet head having two or more ejecting orifices.

A form of the liquid-jet head in the present invention is not particularly restricted. The present invention can be applied to various forms of the liquid-jet heads mentioned below: the liquid-jet heads using piezoelectric elements, for example, such as disclosed in U.S. Pat. Nos. 3,683,212, 3,946,398, 3,747,120, etc.; the liquid-jet head using heat energy such as disclosed DE-OS No. 2,843,064; the modified liquid-jet head such as disclosed in these specifications; the liquid-jet head to be used in the recording apparatus for the continuous liquid-jet process in which the direction of flying droplets are controlled; and the like.

An equipment in which the liquid-jet apparatus according to the present invention is applied to a printer will be described below.

Figure 12:
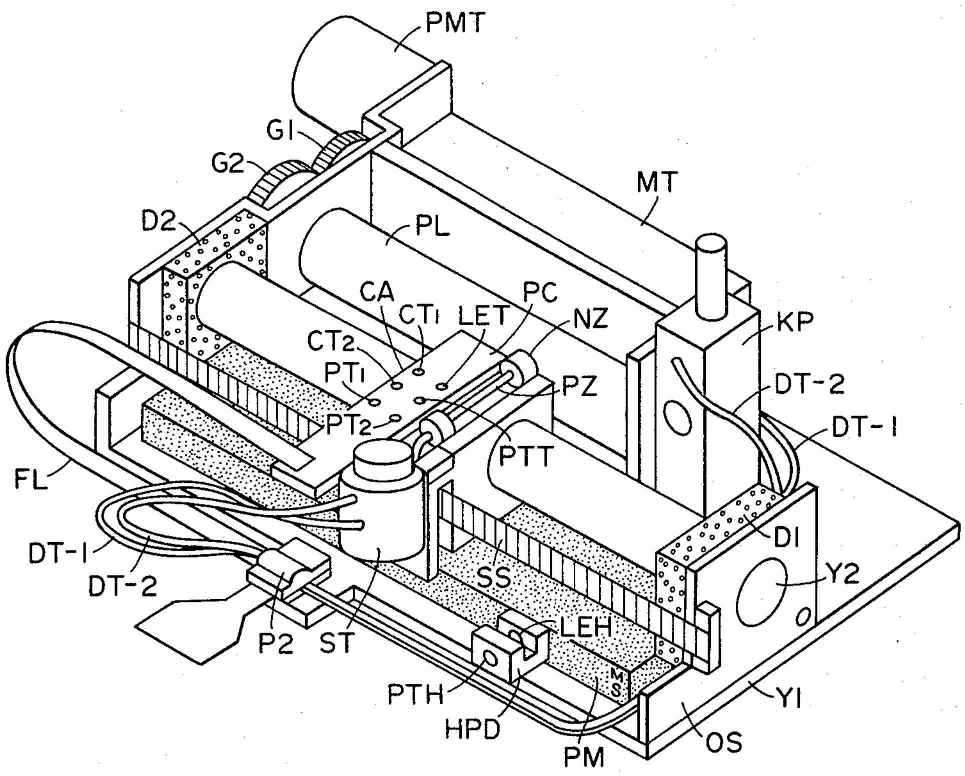
FIG. 12 is a diagrammatical oblique view showing an external appearance of the inventive apparatus used for a printer.
Figure 13:
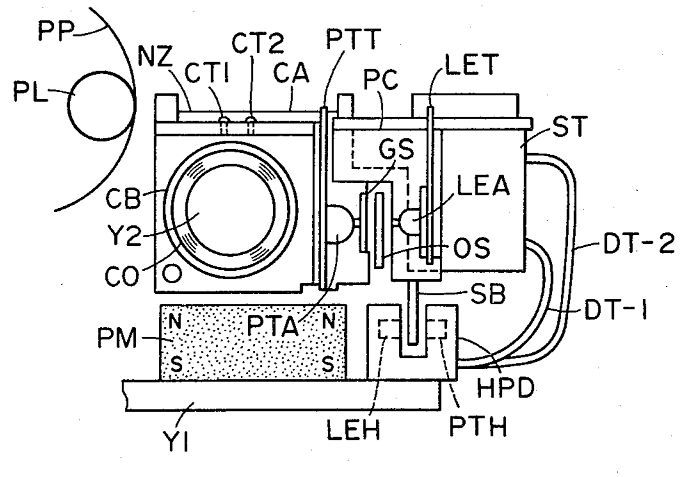
FIG. 13 is a cross sectional view of the equipment of FIG. 12.

FIGS. 12 and 13 illustrate an example of a printer which uses the liquid-jet apparatus according to the present invention. Reference character NZ represents an ink-jet nozzle (recording head) having piezoelectric elements PZ for generating energy for ejecting liquid droplets. The ink-jet nozzle NZ is loaded on a carriage CA which slides slidewise and is controlled with a linear motor. The linear motor comprises a closed magnetic circuit formed with a permanent magnet PM, a magnetic yoke plate Y1, and a magnetic sliding shaft Y2, and a uniform magnetic field is formed between the permanent magnet PM and the magnetic sliding shaft Y2. The carriage CA is slidably disposed on the magnetic sliding shaft Y2 in such a way that a portion of a coil CO which is wound around a coil-bobbin CB formed as one body with the carriage CA intersects at right angles to the magnetic field. When an electric current passes through the coil CO wound around the coil-bobbin CB, the carriage CA slides slidewise on the sliding shaft Y2 by a driving force generated on the ground of the Fleming's righthand rule. The sidewise movement of the carriage CA on the driving shaft Y2 is carried out on the ground that a direction of the driving force is turned by turning a direction of an electric current passed into the coil CO wound around the coil-bobbin CB.

In the carriage CA, a light-emitting diode LEA and a phototransistor PTA are oppositely disposed as shown in FIG. 12. LEA and PTA are used for elements for generating a timing pulse for controlling detection of a position of the carriage CA, an ink-jet timing of an ink-jet nozzle NZ, delivery and the like. On the light-receiving section of the phototransistor PTA is disposed a receiving slit GS having the same width as that of slits SS on an optical slit OS. An electric connection plate PC is fixed on the carriage CA. On the electric connection plate PC are mounted terminals CT1, and CT2 of the coil CO, terminals PT1 and PT2 of the piezoelectric element PZ, a terminal LET of the light-emitting diode LEA, and a terminal PTT of the phototransistor PTA. These terminals are connected to the flexible cable FL fixed on an end section of the connection plate PC, respectively. The other end side of the flexible cable FL is fixed to a printer with a clamping plate P2 in such a way that the flexible cable FL is turned on the way. The turned end portion of the flexible cable FL is connected to a connector (not shown) so that driving the carriage CA and the piezoelectric element PZ for the ink-jet nozzle NZ are controlled through the flexible cable FL. A shielding board SB is mounted as a projection of the down side of the carriage CA. When the shield board SB is located in the concavity of a member HPD for detecting the initial position having a concave section which is mounted on the magnetic yoke plate Y1, the initial position HP of the carriage CA is detected in such a way that the shield plate SP isolates the light-emitting diode LEH and the phototransistor PTH which are oppositely disposed at the concave section of the detecting member HPD.

Reference character ST represents a sub-tank (second tank) loaded on the carriage CA. An ink stored in a main tank MT (first tank) having a press means is supplied into the sub-tank ST through an ink-supplying path (first connection path) DT, and the like is supplied into the ink-jet nozzle NZ from here. Reference character DT-2 represents a connection tube (second path) communicatively connecting between the sub-tank ST and a liquid-containing means KP having a suction mechanism. Reference character DT-2 is used for supplying an ink to the sub-tank and the ink-jet nozzle NZ under the initial conditions, or sucking the air and/or the liquid in the sub-tank to the side of the liquid-containing means KP. The ink-supplying path DT-1 and the connection tube DT-2 are fixed with the fixing plate P2 on a point, respectively. Reference character PMT represents a pulse-motor, reference character PL represents a platen on which paper to be printed KP is delivered. The driving force of the pulse-motor PMT is decreasingly transmitted to the platen PL through a gear (not shown) attached on an end of the output shaft (not shown) taken out from an end of the pulse-motor, a gear G1, and a gear G2 which is fixed on the axis of the platen PL to delivery paper by driving the platen PL.

Reference characters D1 and D2 represent dampers for damping impact which are fixedly mounted at the both ends of the magnetic sliding shaft Y2. Dampers D1 and D2 damp the impact-force produced upon collision of the carriage CA sliding on the sliding shaft Y2 with each end of the sliding shaft Y2. Therefore, dampers D1 and D2 prevent the ink from leaking at the ink-jet nozzle NZ, the over-regression of meniscus of the ink, and the ink from over-forming in the sub-tank ST. Dampers D1 and D2 are made of elastomers such as foamed members.

Upon supplying ink or effecting an operation for restoration of printing, the liquid-containing means KP connects with the ink-jet nozzle NL to suck the ink from the nozzle NL. After completion of printing, the liquid-containing means KP covers the tip portion of the ink-jet nozzle NZ to serve as a cap for prevention of clogging and drying at the ink-jet nozzle NG.

Reference character OS represents optical slits for detecting a printing-position. OS is provided with a number of slits at equal spaces. As shown in FIG. 13 the optical slit OS is disposed in a space where the light-emitting diodes LEA and the phototransistor PTA mounted on the carriage CA as a pair of elements for generating a timing pulse are faced to each other.

What we claim is:

1. A liquid-jet apparatus comprising a first tank containing liquid, a sub-tank in communication with said first tank for receiving liquid supplied from said first tank, a liquid-ejecting head connected to said sub-tank to eject the liquid supplied from said sub-tank, and a suction mechanism in direct communication with said sub-tank and adapted for communication by a second path with said liquid-ejecting head, said suction mechanism reducing the pressure of the sub-tank directly so that liquid from said first tank is supplied to said sub-tank, said suction mechanism reducing the pressure of said liquid-ejecting head by way of said second path when said suction mechanism communicates with the liquid-ejecting head, so that the liquid is sucked from said sub-tank into said liquid-ejecting head.

2. A liquid-jet apparatus according to claim 1, wherein said first tank and said sub-tank are communicatively connected to each other by at least one connection path.

3. A liquid-jet apparatus according to claim 1, wherein said sub-tank and said liquid-ejecting head are constructed as one body.

4. A liquid-jet apparatus according to claim 1, wherein said suction mechanism is provided with a connector which is removably connected to said liquid-ejecting head.

5. A liquid-jet apparatus according to claim 1, wherein said sub-tank and said suction mechanism are communicatively connected to each other by at least one connection path.

6. A liquid-jet apparatus according to claim 5, further comprising a fluid-resistant disposed in the connection path.

7. A liquid-jet apparatus according to claim 1, wherein said suction mechanism is provided with a discharge path for air and liquid.

8. A liquid-jet apparatus according to claim 1, wherein said sub-tank and the liquid-ejecting head are communicatively connected to each other by a conduit which is present in said sub-tank.

9. A liquid-jet apparatus according to claim 8, further comprising in which a filter is disposed in the conduit.

10. A liquid-jet apparatus according to claim 1, wherein said sub-tank and said suction mechanism are each provided with a hole so that said sub-tank and said suction mechanism can be communicatively connected to each other by the holes.

11. A liquid-jet apparatus according to claim 1, wherein said suction mechanism is provided with a liquid-absorbing means.

12. A liquid-jet apparatus according to claim 1, wherein said first tank is constructed so as to be able to be pressurized.

13. A liquid-jet apparatus according to claim 1, wherein the liquid in said first tank is discharged to said sub-tank as said first tank is pressed.

14. A liquid-jet apparatus according to claim 1, wherein said sub-tank and said liquid-ejecting head are constructed as one body, and said sub-tank and said liquid-ejecting head move relative to said first tank and said suction mechanism.

15. A liquid-jet apparatus according to claim 1, wherein said sub-tank is provided with a vent.

16. A liquid-jet apparatus according to claim 15, further comprising a filter disposed in the vent, said filter allows passage of gas and hinders passage of liquid in the vent.

17. A liquid-jet apparatus comprising a first tank containing liquid, a sub-tank in communication with said first tank for receiving the liquid supplied from said first tank, a liquid-ejecting head connected to said sub-tank to eject the liquid supplied from said sub-tank, said first tank being provided with a press means by which the liquid in said first tank is discharged into said sub-tank, and a suction mechanism in communication with said sub-tank by one direct path, and adapted for communication directly with said liquid-ejecting head by another path, said suction means, reducing the pressure in both said liquid-ejecting head, and, by said one direct path, in said sub-tank.

18. A liquid-jet apparatus according to claim 17, wherein said first tank and said sub-tank are communicatively connected to each other by at least one connection path.

19. A liquid-jet apparatus according to claim 17, wherein said sub-tank and said liquid-ejecting head are constructed as one body.

20. A liquid-jet apparatus according to claim 17, wherein said suction mechanism is provided with a connector which is removable connected to said liquid-ejecting head.

21. A liquid-jet apparatus according to claim 17, wherein said sub-tank and said suction mechanism are communicatively connected to each other by at least one connection path.

22. A liquid-jet apparatus according to claim 21, further comprising a fluid-resistant disposed the connection path.

23. A liquid-jet apparatus according to claim 17, wherein said suction mechanism is provided with a discharge path for air and liquid.

24. A liquid-jet apparatus according to claim 17, wherein said sub-tank and said liquid-ejecting head are communicatively connected to each other by a conduit which is present in said sub-tank.

25. A liquid-jet apparatus according to claim 24, further comprising a filter disposed in the conduit.

26. A liquid-jet apparatus according to claim 17, wherein said suction mechanism is provided with a liquid-absorbing means.

27. A liquid-jet apparatus according to claim 17, wherein said first tank is constructed so as to be able to be pressurized.

28. A liquid-jet apparatus according to claim 17, wherein said sub-tank and said liquid-ejecting head are constructed as one body, and said sub-tank and said liquid-ejecting head move relative to said first tank and said suction mechanism.

29. A liquid-jet apparatus according to claim 17, wherein said sub-tank is provided with a vent.

30. A liquid-jet apparatus according to claim 29, further comprising a filter disposed in the vent, said filter allows passage of gas and hinders passage of the liquid in the vent.

* * * * *

UNITED STATES PATENT AND TRADEMARK OFFICE

CERTIFICATE OF CORRECTION

PATENT NO. : 4,383,263

DATED : May 10, 1983

INVENTOR(S) : MASAKAZU OZAWA, ET AL.

It is certified that error appears in the above-identified patent and that said Letters Patent is hereby corrected as shown below:

Column 3, line 20, before "the" (first occurrence), insert --at--.

Column 4, line 34, change "where" to --which--;
line 35, after "at" insert --the--;
line 47, change "At" to --In--.

Column 5, line 41, after "upwards" insert --of--;
line 46, after "existing" insert --at--;
line 49, after "back" insert --to--;
line 54, change "atomosphere" to --atmosphere--.

Column 6, line 25, "passed" should read --past--;
line 35, "passed" should read --past--.

Column 7, line 14, "an" should read --on--;
line 43,"projecting" should read --projection--;
line 48, change "and" (second occurrence) to --as--..

UNITED STATES PATENT AND TRADEMARK OFFICE
CERTIFICATE OF CORRECTION

PATENT NO. : 4,383,263

DATED : May 10, 1983

INVENTOR(S) : MASAKAZU OZAWA, ET AL.

It is certified that error appears in the above-identified patent and that said Letters Patent is hereby corrected as shown below:

Column 8, line 11, change "temporally" to --temporarily--;
line 68, after "where" insert --it--.

Column 9, line 68, after "of" (first occurrence) insert --the--; same line, after "of" (second occurrence) insert --the--.

Column 10, line 19, change "necessary" to --necessarily--.

Column 11, line 59, after "upward" insert --of--.

Column 12, line 59, change "cause" to --course--.

Column 13, line 20, "requied" should read --required--;
line 64, after "existing" insert --on--;
line 67, after "back" insert --to--;

Column 14, line 17, delete "resulting";
line 43, change "passed" to --past--;
line 53, change "passed" to --past--.

Column 15, line 2, change "in" to --is--;
line 5, change "is" to --if--;
line 7, change "At" to --In--;
line 10, change "At" to --In--;
line 11, change "than" to --of--.

Column 16, line 7, after "of" (first occurrence) insert --the--.

Column 17, line 20, change "temporally" to --temporarily--;
line 51, after "of" (first occurrence) insert --the--;

UNITED STATES PATENT AND TRADEMARK OFFICE

CERTIFICATE OF CORRECTION

PATENT NO. : 4,383,263

DATED : May 10, 1983

INVENTOR(S) : MASAKAZU OZAWA, ET AL.

It is certified that error appears in the above-identified patent and that said Letters Patent is hereby corrected as shown below:

Column 17, line 56, after "Figure" insert --8A--;
line 63, after "of" (first occurrence) insert --the--.

Column 18, line 10, after "The" delete "the";
line 64, "if" should read --is--;
line 66, change "816" to --806--;
line 67, change "806" to --816--.

Column 19, line 7, after "part" insert --of--.

Column 20, line 30, change "813" to --831--.

Column 21, line 15, change "There" to --These--.

Column 22, line 55, after "existing" insert --at--;
line 57, after "back" insert --to--.

Column 23, line 34, change "passed" to --past--;
line 37, change "such" to --suck--;
line 67, change "At" to --In--.

Column 24, line 26, change "pathes" to --paths--.

UNITED STATES PATENT AND TRADEMARK OFFICE

CERTIFICATE OF CORRECTION

PATENT NO. : 4,383,263

DATED : May 10, 1983

INVENTOR(S) : MASAKAZU OZAWA, ET AL.

It is certified that error appears in the above-identified patent and that said Letters Patent is hereby corrected as shown below:

Column 25, line 53, after "liquid-jet" insert --head--.

Column 26, line 16, change "or them" to --or both of them--;

line 51, change "slidewise" to --sidewise--;

line 63, change "slidewise" to --sidewise--;

Claim 1, line 6 (Column 28, line 24), after "communication" insert --by a first path--;

line 13 ( Column 28, line 31), change "the" to --said--.

Claim 8, line 2 (Column 28, line 56), change "the" to --said--..

Claim 9, line 2 (Column 28, line 60), delete "in which"; same line, delete "is".

Claim 22, line 2, after "disposed" insert --in--.

Signed and Sealed this

*Twenty-seventh* Day of *December 1983*

[SEAL]

*Attest:*

GERALD J. MOSSINGHOFF

*Attesting Officer* *Commissioner of Patents and Trademarks*